United States Patent [19]

Sekiguchi

[11] Patent Number: 5,095,445

[45] Date of Patent: Mar. 10, 1992

[54] DATA COMMUNICATION SYSTEM CAPABLE OF COMMUNICATING ON-LINE WITH COMMUNICATION TERMINAL EQUIPMENT OF A PLURALITY OF TYPES

[75] Inventor: Kenzo Sekiguchi, Machida, Japan

[73] Assignee: Canon Kabushiki Kaisha, Tokyo, Japan

[21] Appl. No.: 569,736

[22] Filed: Aug. 22, 1990

Related U.S. Application Data

[63] Continuation of Ser. No. 169,614, Mar. 17, 1988, abandoned.

[30] Foreign Application Priority Data

Mar. 20, 1987 [JP] Japan .................. 62-66730
Oct. 10, 1987 [JP] Japan ................. 62-262634

[51] Int. Cl.⁵ .......................................... H04N 1/00
[52] U.S. Cl. ............................. 364/514; 364/550; 364/138; 364/140; 358/400; 358/403; 358/405; 340/825.06
[58] Field of Search ............ 364/514, 550, 551.01, 364/138, 140, 147, 148, 150; 375/7, 10, 106–110, 121; 358/256, 258, 260, 264, 267, 400, 403, 405; 340/825, 825.01, 825.06, 825.13

[56] References Cited

U.S. PATENT DOCUMENTS

| 4,271,478 | 6/1981 | Fink et al. ............... 364/514 |
| 4,454,575 | 6/1984 | Bushaw et al. .......... 358/256 |
| 4,527,885 | 7/1985 | Ayata et al. ............. 358/256 |
| 4,682,286 | 7/1987 | Yamada .................... 358/256 |
| 4,727,435 | 2/1988 | Otani et al. .............. 358/256 |
| 4,733,303 | 3/1988 | Koshiishi ................. 358/257 |
| 4,750,137 | 6/1988 | Harper et al. ........... 364/514 |
| 4,771,391 | 9/1988 | Blasbalg .................. 364/514 |
| 4,772,955 | 9/1988 | Kurahayashi et al. .... 358/260 |
| 4,819,063 | 4/1989 | Sugiura et al. ........... 358/75 |
| 4,827,349 | 5/1989 | Ogata et al. ............. 358/256 |
| 4,829,385 | 5/1989 | Takezawa ................ 358/260 |

FOREIGN PATENT DOCUMENTS 2333400   6/1977   France .
2451075  10/1980   France .
57-184362 11/1982  Japan .
60-137169  7/1985  Japan .

OTHER PUBLICATIONS

IEEE Globecom '85, "Recent Advances in Facsimile Communications", Y. Yamazaki, Dec. 1985.

Primary Examiner—Parshotam S. Lall
Assistant Examiner—Brian M. Mattson
Attorney, Agent, or Firm—Fitzpatrick, Cella, Harper & Scinto

[57] ABSTRACT

A data transmission system avoids charging of line utilization fees when it is attempted to send data to a destination incapable of receiving the data and can be readily operated even by an operator having little technical knowledge. By storing function information relating to the terminals of a plurality of parties, the system automatically determines prior to transmission whether data is capable of being transmitted to a destination. On the basis of the function information and the data to be transmitted, a list of parties which are and are not capable of receiving a transmission is displayed on a CRT, thereby enabling the operator to visually identify in advance which parties can and cannot be sent data. The system makes it possible to identify at least the form of data to be transmitted and to display the list of parties which are and are not capable of receiving a transmission.

30 Claims, 24 Drawing Sheets

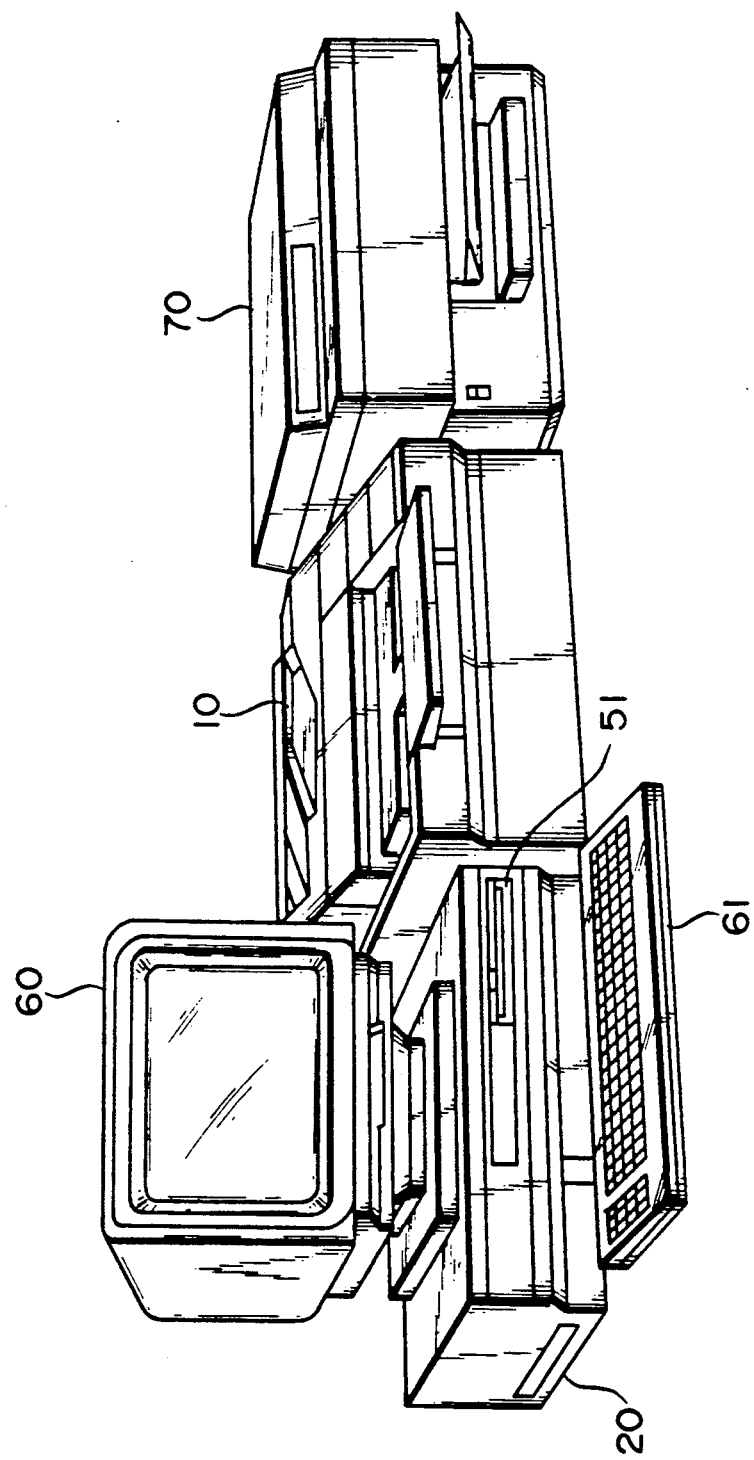
F I G. 2

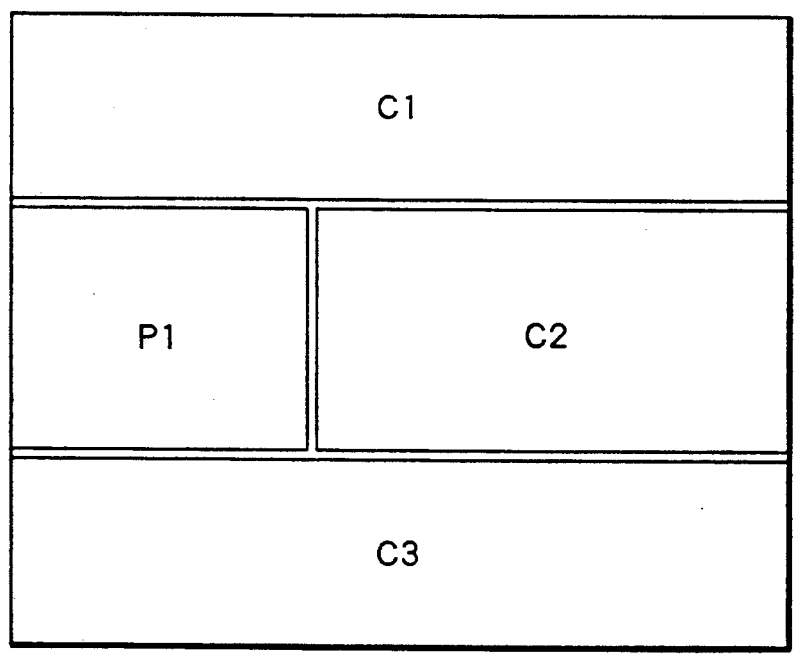
F I G. 8

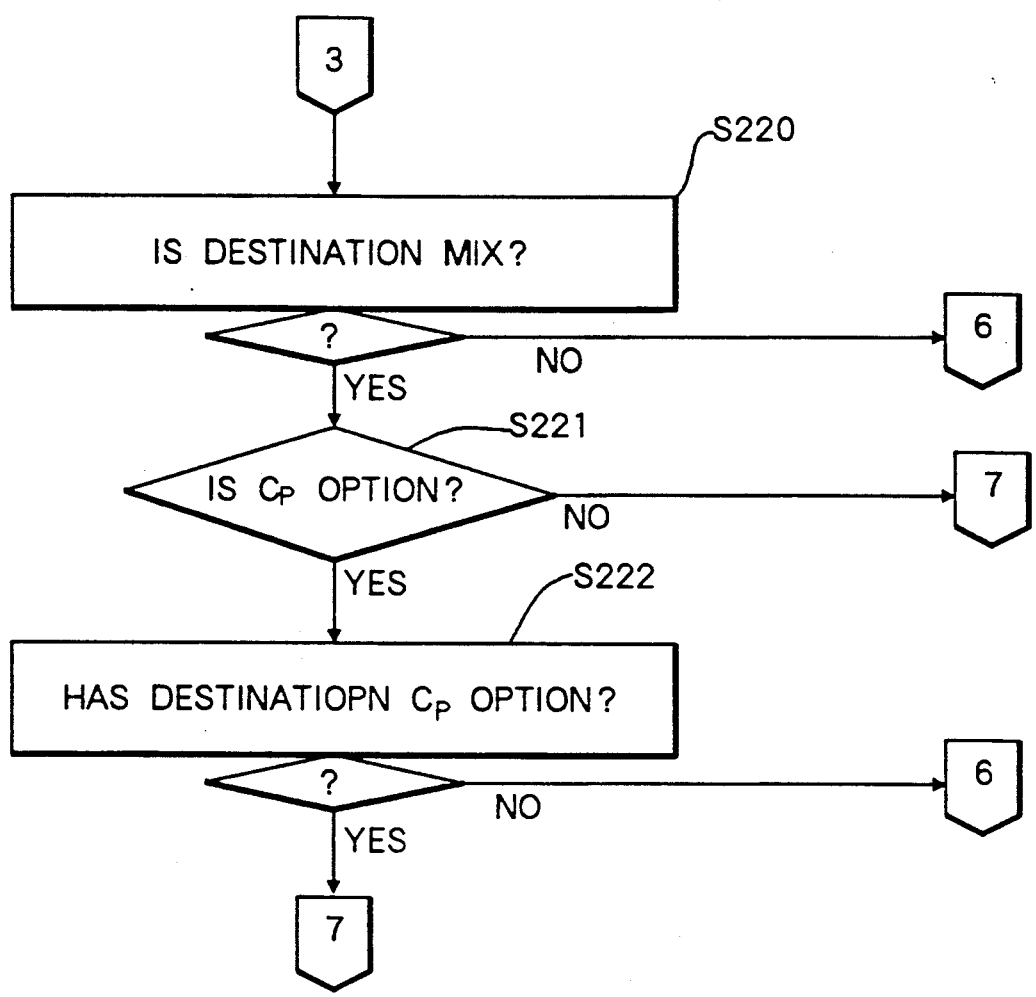
F I G. 9D
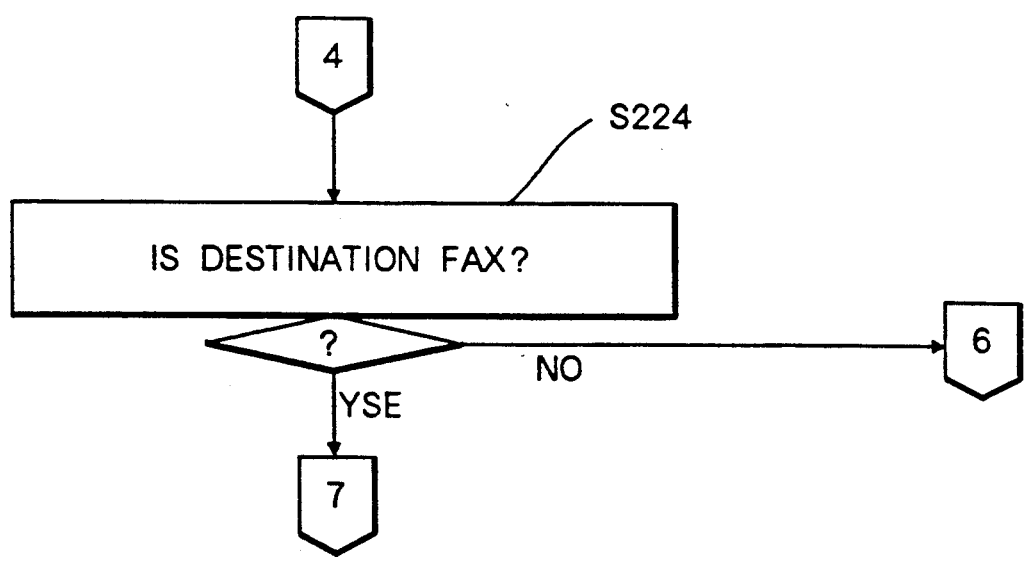
F I G. 9E

DATA COMMUNICATION SYSTEM CAPABLE OF COMMUNICATING ON-LINE WITH COMMUNICATION TERMINAL EQUIPMENT OF A PLURALITY OF TYPES

This application is a continuation-in-part continuation of application Ser. No. 07/169,614 filed Mar. 17, 1988, now abandoned.

BACKGROUND OF THE INVENTION

This invention relates to a data communication system capable of communicating with communications apparatus of a plurality of types.

In a system of this kind, a mixed mode terminal capable of handling e.g. character code data and image data is capable of communicating with a facsimile device, a telex device and a mixed mode terminal.

When such a mixed mode terminal transmits data, there are cases where data transmission cannot be achieved, depending upon the type of data and the terminal characteristics of the other party. For example, if an attempt is made to transmit image data to a teletex device, the data ordinarily cannot be transmitted. Accordingly, the operator must decide whether or not to instruct that the transmission be made upon taking into consideration whether or not the other party is capable of receiving the data to be transmitted.

Thus, unless the operator is aware of the other party's terminal characteristics and the mode of the data to be transmitted, the proper transmission instruction cannot be made. This means that the transmission system cannot be simply operated by an ordinary individual. Furthermore, if the instruction to transmit the data is inputted to the system in spite of the fact that the transmission actually is not possible, the equipment operates wastefully. Moreover, since the input of the instruction to send the data will be judged to be illegal on the side of the other party only after the input has been connected to the communication line of the other party's terminal, the sending party must bear the charge of using the communication line until the line is opened.

SUMMARY OF THE INVENTION

A first object of the present invention is to provide a data communication system which represents an improvement upon the prior art.

A second object of the present invention is to provide a data communication system capable of judging whether data can be transmitted to a certain destination before the data transmission is attempted. The purpose of this is to reduce line utilization fees by avoiding inadvertent connection of lines.

According to the present invention, the foregoing object is attained by providing a data communication system capable of communicating on-line with communication terminal equipment of a plurality of types, comprising memory means for storing function information relating to terminal equipment possessed by every communicating party, discriminating means for comparing a form of transmission data with the function information stored in the memory means, and for deciding whether or not the transmission data is capable of being transmitted, designating means for designating at least one transmission destination to which the transmission data is to be transmitted, and processing terminating means for terminating data transmission processing when a party, to which the discriminating means has decided the data cannot be transmitting, is designated by the designating means.

A third object of the present invention is to provide a data transmission system which displays, based on data to be transmitted and in readily distinguishable fashion, parties that are and are not capable of housing the data transmitted thereto. The purpose of this is to make it easy for an operator to ascertain whether a transmission is possible based on the form of the data which is to be transmitted.

According to the present invention, the second object is attained by providing a data communication system capable of communicating on-line with communication terminal equipment of a plurality of types, comprising memory means for storing function information, relating to terminal equipment possessed by every communicating party, discriminating means for comparing a form of transmission data with the function information stored in the memory means, and for deciding whether or not the transmission data is capable of being transmitted, and display means for displaying in distinguishable fashion, based on the decision made by the discriminating means, parties to which the data is capable of being transmitted and parties to which the data is incapable of being transmitted.

A fourth object of the present invention is to provide a data transmission system which, in addition to the advantages of the second embodiment, makes it possible for an operator to easily ascertain the form of data to be transmitted.

According to the present invention, the third object is attained by providing a data communication system capable of communicating on-line with communication terminal equipment of a plurality of types, comprising memory means for storing function information relating to terminal equipment possessed by every communicating party, modifying means for modifying a form of transmission data, first display means for displaying the form of the transmission data and the form of the transmission data modified by the modifying means, designating means for designating one displayed form of data, discriminating means for comparing the form designated by the designating means with the function information stored in the memory means, and for deciding whether or not the transmission data is capable of being transmitted, and second display means for displaying in distinguishable fashion, based on the decision made by the discriminating means, parties to which the data is capable of being transmitted and parties to which the data is incapable of being transmitted.

Other objects, features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a perspective view illustrating the external appearance of the data transmission system of the present embodiment;

FIG. 8 is a view illustrating various areas in a mixed mode terminal;

FIGS. 9A through 9E are flowcharts illustrating processing for selecting destinations to which data can be transmitted in accordance with another embodiment.

DESCRIPTION OF THE PREFERRED EMBODIMENTS

An embodiment of the invention will now be described in detail with reference to the drawings.

The general operation of a mixed mode terminal will be described first.

A mixed mode facsimile device is referred to as a G4 facsimile device based on the recommendation of the CCITT (International Telegraph and Telephone Consultative Committee) and, as shown in FIG. 8, is capable of transmitting and receiving an image in which rectangular areas consisting of a picture image pattern area (P1) and character areas (C1–C3) comprising character codes and the like are mixed in one page of an image. When the illustrated image is transmitted to a mixed mode terminal, the image and character information need only be transmitted as is. However, when a conventional terminal of G3 or less is on the transmitting side, the characters in the areas C1–C3 are first converted into images and all characters are transmitted as images. If the information on a page is composed of character codes in its entirety, transmission is possible even if the terminal on the receiving end is a TTX (teletex). The above-mentioned rectangular areas P1 and C1 through C3 shall be referred to as blocks hereinafter.

Figure 1:
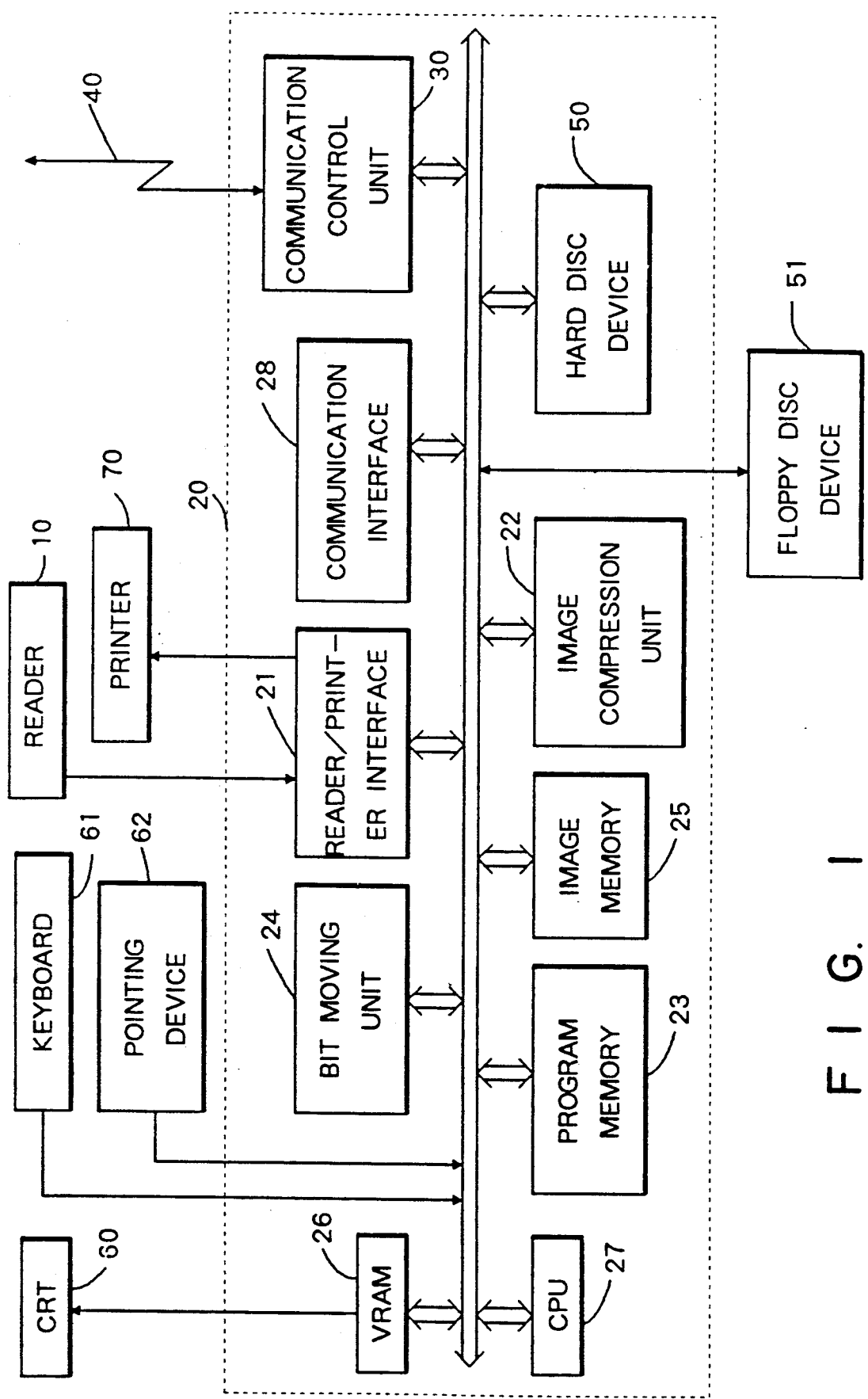
FIG. 1 is a block diagram illustrating the construction of a data transmission system embodying the present invention.

FIG. 1 is a block diagram showing the construction of a mixed mode terminal according to the present embodiment, and FIG. 2 is a perspective view illustrating the system of the embodiment.

A reader 10 is adapted to read a desired document and output an electric signal indicative of the information read.

A facsimile device 20 includes a reader/printer interface 21, an image compression unit (hereinafter referred to as an "ICU") 22, a program memory (hereinafter referred to as a "PMEM") 23, a bit moving unit (hereinafter referred to as a "BMU") 24, an image memory (hereinafter referred to as an "IMEM") 25, a video RAM (hereinafter referred to as a "VRAM") 27, a central processing unit (hereinafter referred to as a "CPU") 27, a communication interface 28, a bus 29 and a communication control unit (hereinafter referred to as a "CCU") 30.

The ICU 22 is adapted to compress or enlarge data and employs two-dimensional compression (high compression) in order to raise the coding rate.

The PMEM 23 includes a memory area for an OS program and application program for controlling input/output units peripheral to the facsimile device 20 as well as various units within the facsimile device, a font memory area for converting character code data into image bit data, and an area which is used for storing and editing text code data (character data) entered by key or word processor. The PMEM 23 also includes a memory management unit (MMEU) and a work area serving as a transmission data buffer so that data from a hard disc 50 can be transmitted via the CCU 30 or, conversely, so that data from the CCU 30 can be stored on the hard disc 50. This buffering action is for the purpose of bringing the speeds of the disc, telephone lines, etc. into conformance.

The BMU 24 processes data in bit units, performs image editing (image processing) and submits prescribed data to enlargement, reduction, rotation, movement or sampling.

The IMEM 25 is a four-megabyte memory for storing image data from the reader, image data edited by the BMU 24, data enlarged by the ICU 22, character data entered by key, text code data entered by word processor, mixed data and bit data (e.g. represented by one bit of one pixel) obtained by conversion of character code data into an image. Mixed data are data composed of image bit data blocks and character code data blocks mixed in one page. These blocks shall be referred to as image blocks and character blocks, respectively. Each block is managed and stored with an identification code assigned thereto. By temporarily storing prescribed data, the IMEM 25 serves as a buffer for establishing conformance among the speeds of the reader 10, printer 70 and line 40.

The VRAM 26 stores image data, which are displayed on the CRT 60, as bit map data (e.g. wherein image data corresponds to one bit of one pixel).

The hard disc device 50 and a floppy disc device 51 are provided as external storage devices. These devices are non-volatile memories. Memories backed up by battery may be employed as the non-volatile memories. In any case, these disc devices are for storing and preserving both transmitted and received data.

A keyboard 61 is for inputting command data indicative of a transmit or receive command, command data for image processing or word processing, and character data for word processing.

A pointing device 62 (e.g. a mouse input unit) is adapted to move a cursor on the CRT 60 in order to designate a position at which image editing or the like is to take place. A block of mixed data may also be divided by the pointing device 62. The coordinates of the block are stored and managed by the PMEM 23 and are used as one item of data of an identification code (header) at the time of a transmission.

The line 40 preferably is a 64 Kbit/sec digital line of a digital data conversion network or digital data bucket network. If such is the case, high-resolution (high-density) image data containing a large amount of information can be transmitted at high speed and in large quantities.

A printer 70 employs a laser beam printer to print at a speed of 3 Mbps.

A transmitting operation will now be described in detail.

A document is read by the reader 10, from which the image data are stored and preserved in the IMEM 25 via the reader/printer interface 21. The image data are compressed by the ICU 22 at the time of transmission and stored on a disc in the form of an MMR code. Data preserved on a hard disc are sent to a remote station via the CCU 30 and line 40 after being stored in the PMEM 23.

Figure 3:
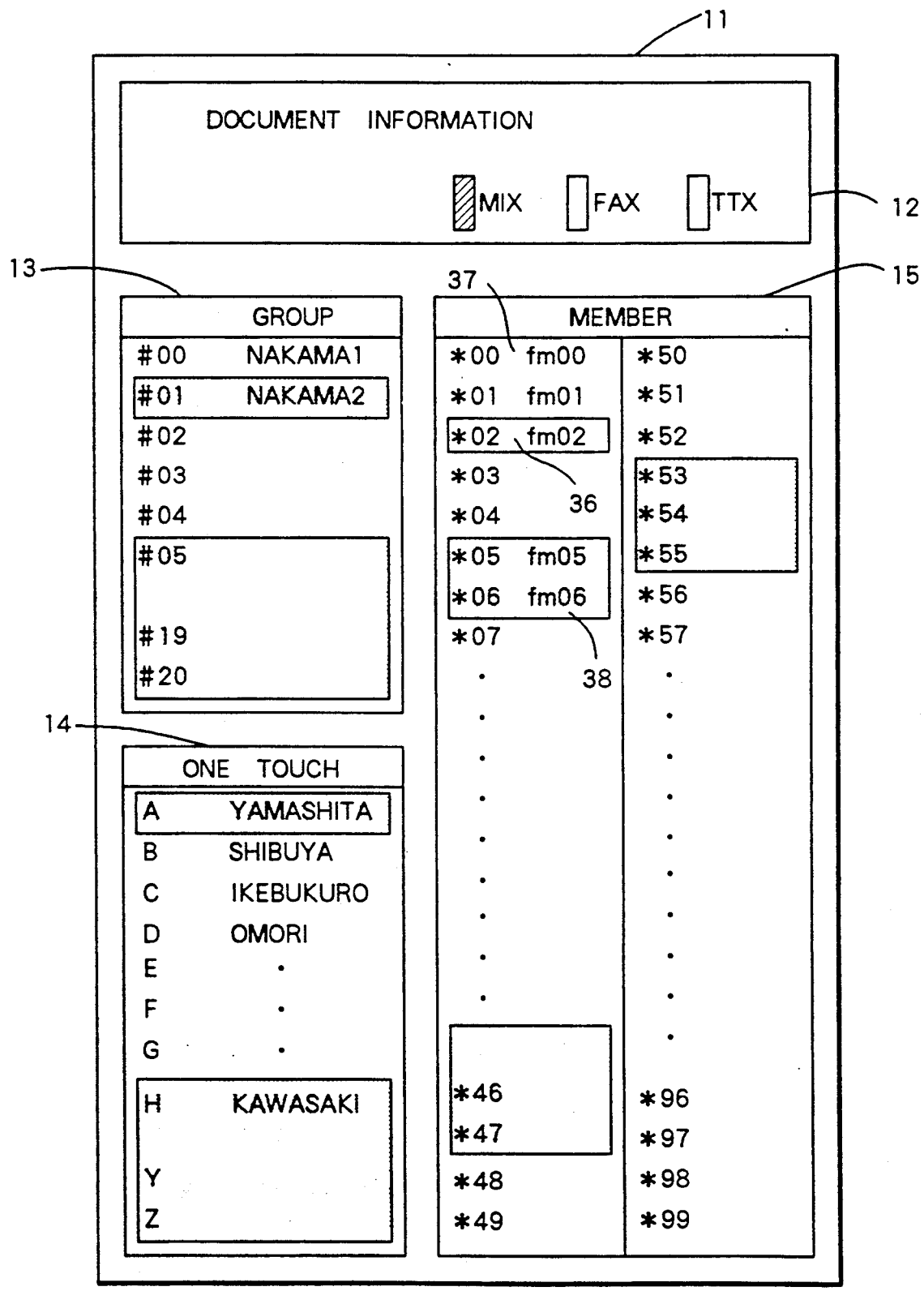
FIG. 3 is a front view illustrating one page of a transmission instruction display which appears on the screen of a CRT in the present embodiment.

Such editing as enlargement, compression and movement of an image in the data preserved on the hard disc 50 is carried out by the BMU 24 after the data are accepted by the IMEM 25 and decoded by the ICU 22. In order to mix in characters in the editing operation, the characters are inputted from the keyboard 61 and converted into character data by the PMEM 22. These characters (or character data preserved on the hard disc) are stored in a character block of an image edited by the BMU 24. To print out the edited results, the edited data are written in the IMEM 25, read out of the IMEM 25, all of the image bit data are developed in the IMEM 25 and then sent to the printer 70 via the reader/printer interface 28. To display the edited results or the data indicative of the process thereof on the CRT 60, the data are written in the VRAM 26, read out of the VRAM 26 and then outputted to the CRT 60. To transmit the data after editing, the data are temporarily preserved on the hard disc 50 and then written in the PMEM 23, read out of the PMEM 23 and sent to the remote station via the CCU 30 and line 40. If it is attempted to transmit the data at this time, a destination designating display is presented on the CRT 60, as shown in FIG. 3, in accordance with the present embodiment. In FIG. 3, numeral 11 denotes the destination designating display, and numeral 12 denotes a basic terminal characteristic section showing the terminal characteristic of a party to which a transmission is capable of being made. This section corresponds to a conversion format described later. Numeral 14 denotes a one-touch destination registration section, and 15 a destination registration section.

Numeral 36 denotes one designated destination registration section. Numeral 37 denotes an abbreviated dialing section for designatable destinations, and 38 denotes an abbreviated dialing section for an undesignatable destination. This destination-related information (destination dialing information, terminal characteristic, etc.) is stored on the hard disc 50.

By thus distinguishing between parties to which a transmission can and cannot be made and displaying the same before the line is actually connected, any operator will be capable of judging whether or not data can be transmitted to another party. In addition, a line utilization fee need not be paid since the judgment can be made before the line is connected.

How to judge whether or not edited data can be transmitted is important. In the present embodiment, judgment is made based on the characteristics of the edited data and the above mentioned information relating to destination. An example of a group of information relating to destination stored on the hard disc 50 is illustrated in FIG. 4 and will now be described in detail.

Figure 4:
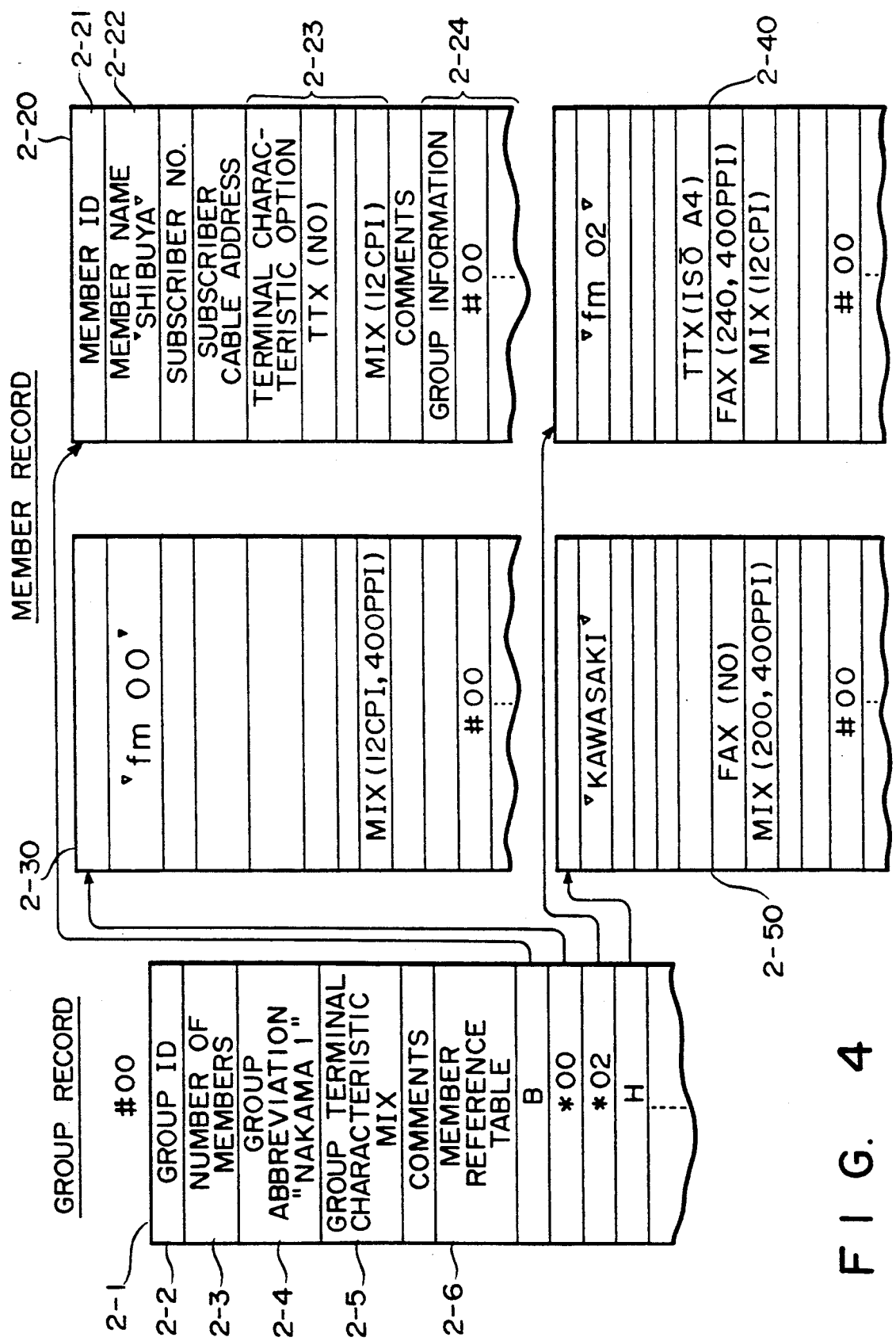
FIG. 4 is a conceptual view showing the configuration of destination data.

As shown in FIG. 4, information relating to each destination is composed of a table holding one group of information. Stored at the beginning of each table is an ID code which indicates whether the table information is multiple address destination information, one-touch destination information or abbreviated destination information. It should be noted that the data stored in the ID codes is not limited to that mentioned, and other types of data will be described below.

In FIG. 4, numeral 2-1 denotes a group record ("NAKAMA 1") for holding multiple address destination information. (This record is an element of management data corresponding to a multiple address destination registration section 13 in FIG. 3.) 2—2 holds such information as whether the group record is used/unused, transmittable/non-transmittable, etc. 2-3 represents the number of members, namely the number of registered destinations in the group. 2-4 is the abbreviation of the name of the group (this portion is displayed). 2-5 shows the group terminal characteristics contained in all destinations within the group. 2-6 is a member reference table of destinations within the group. 2-20 is a member record ("SHIBUYA") for holding individual destination information. 2-21 holds information as to whether the member record is used/unused, transmittable/non-transmittable. 2-22 is a member name, namely the name of a destination. 2-23 shows options of the terminal characteristic of the destination. 2-24 is group information in which group records to be referred to are written. Group records to be referred to shown at 2-30 through 2-80 are the corresponding member records in FIG. 3.

A method of distinguishing among and classifying destinations will now be described with reference to FIGS. 5 and 6.

Figure 5:
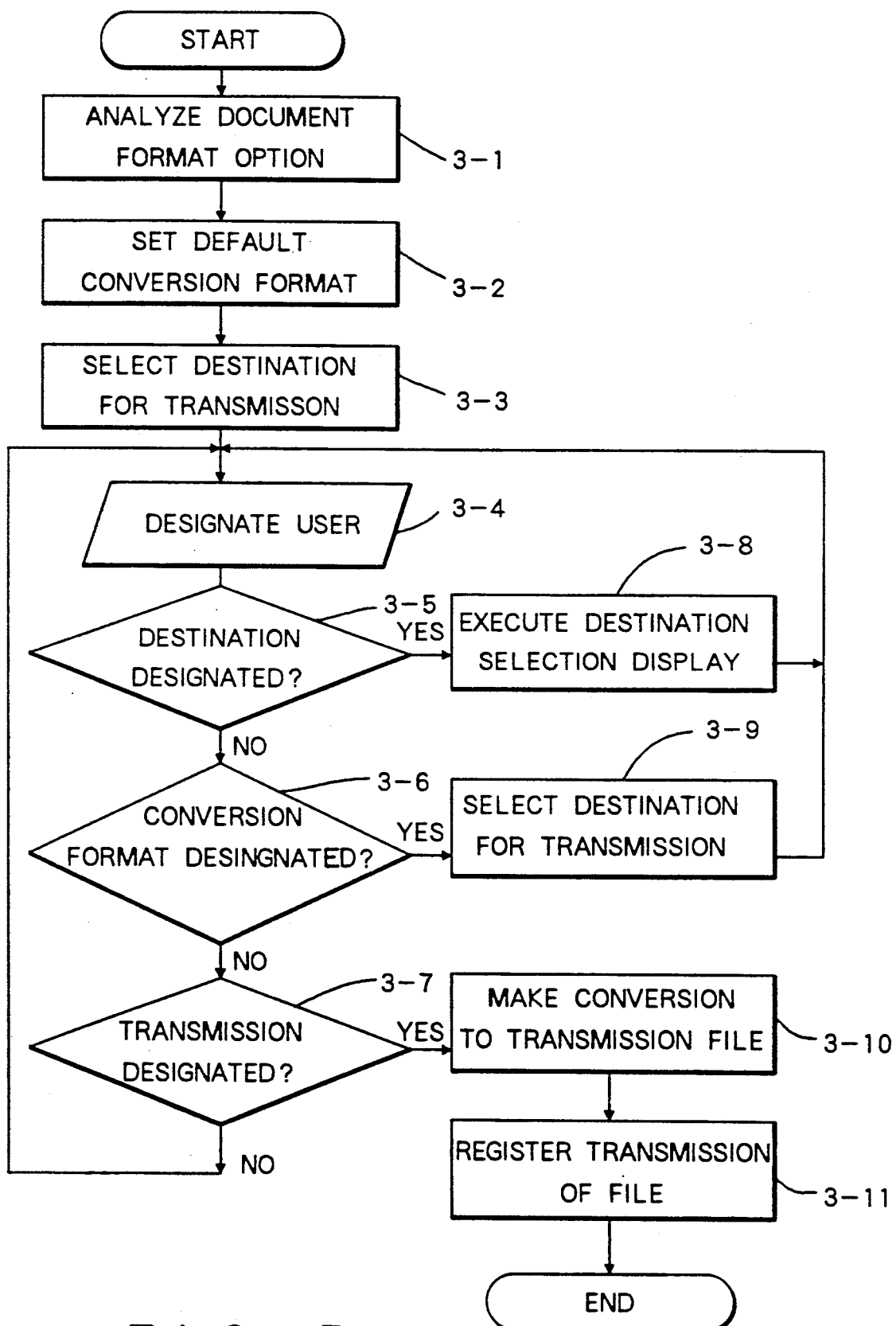
FIG. 5 is a flowchart illustrating transmission instruction processing according to the present embodiment.
Figure 6:
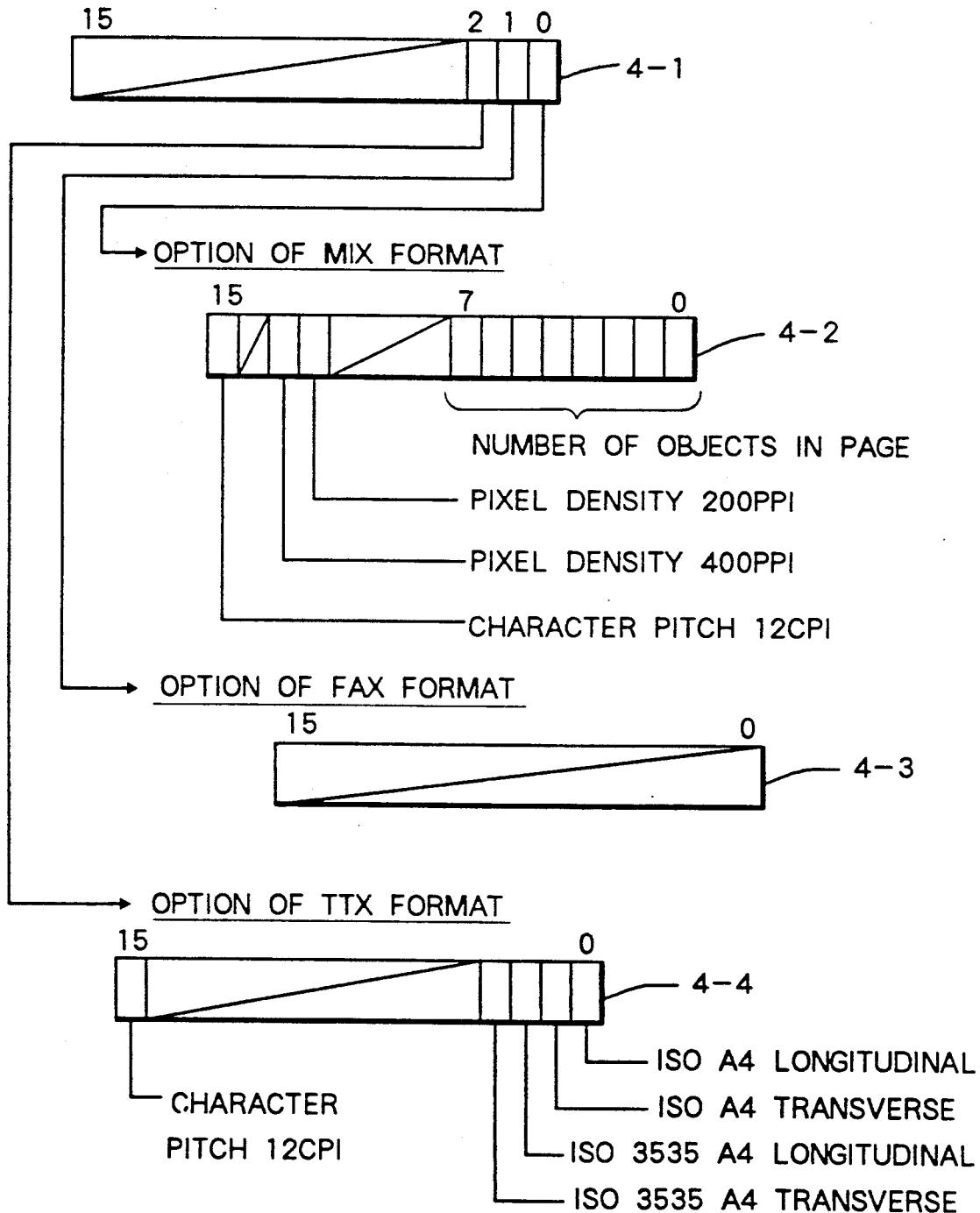
FIG. 6 is a conceptual view showing conversion format data for transmission data.
Figure 7A:
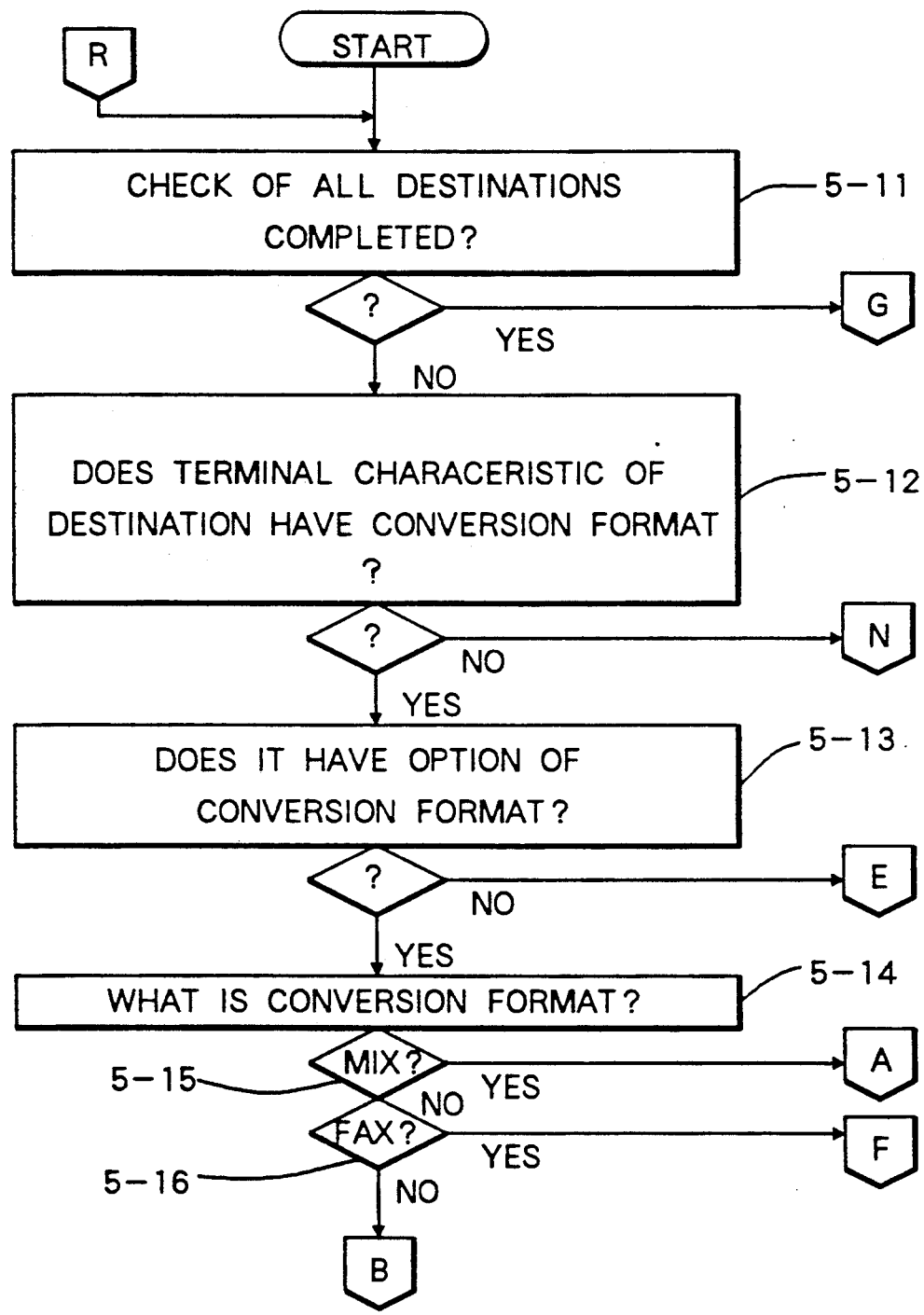
FIGS. 7A through 7I are flowcharts illustrating processing for selecting destinations to which data can be transmitted in accordance with the present embodiment.
Figure 7B:
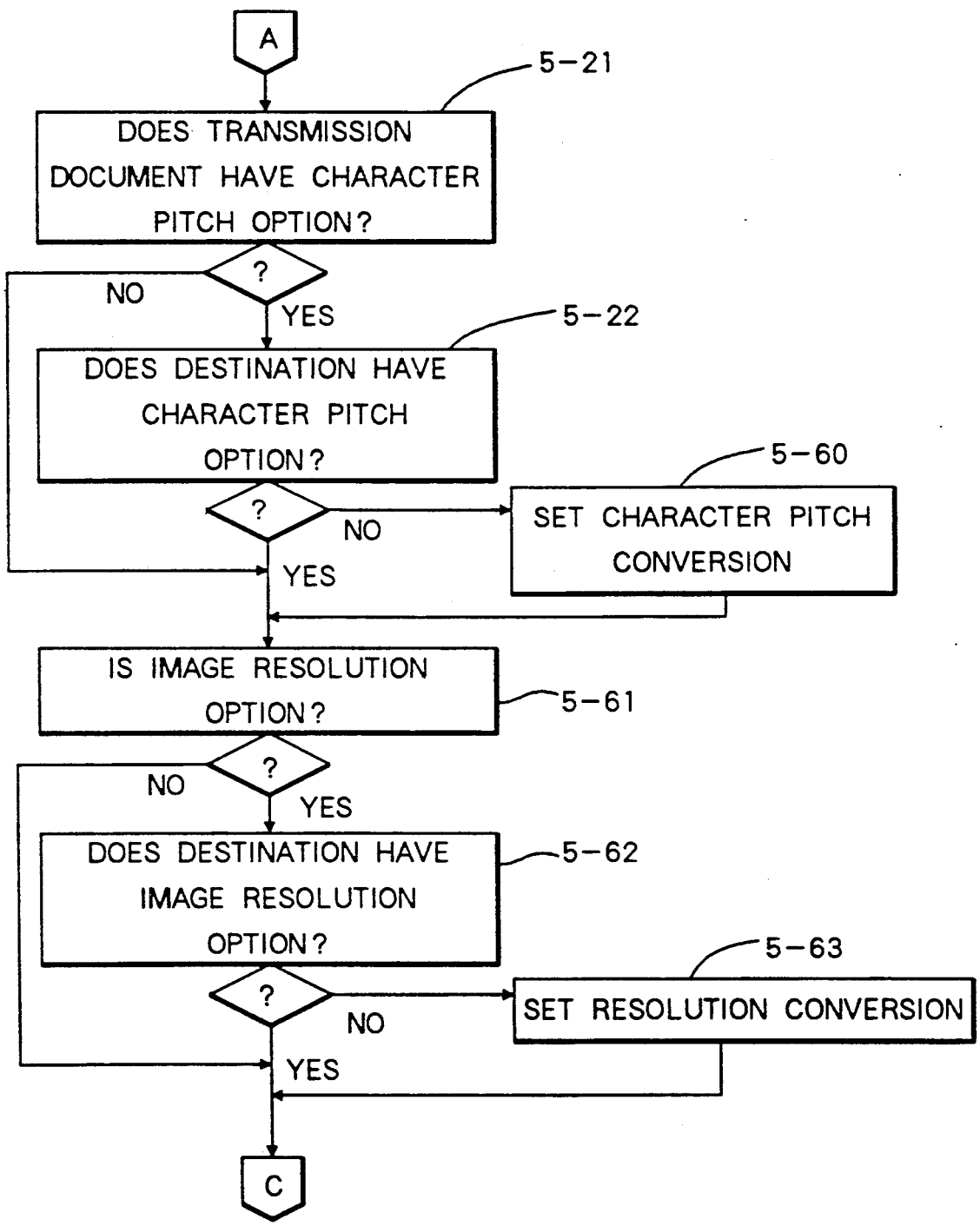
Figure 7C:
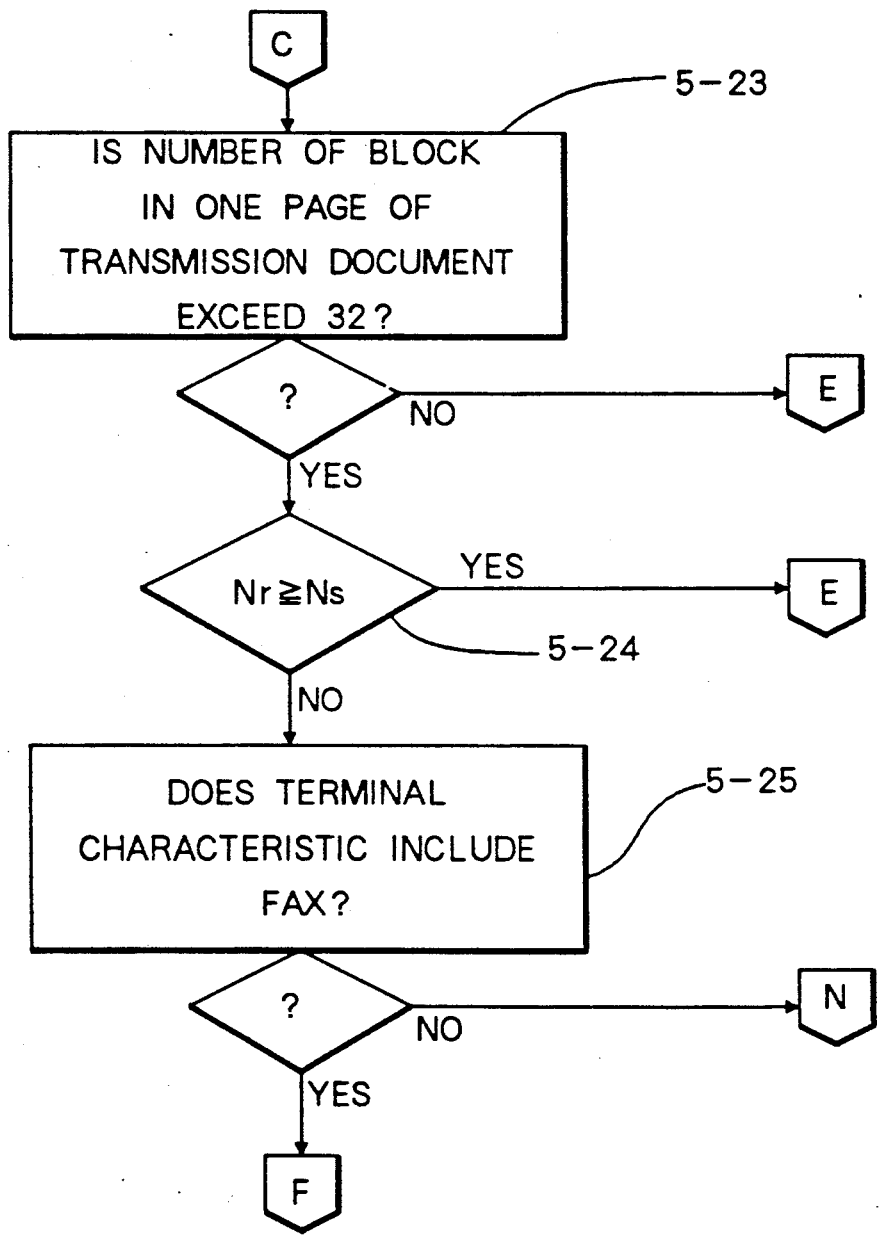
Figure 7D:
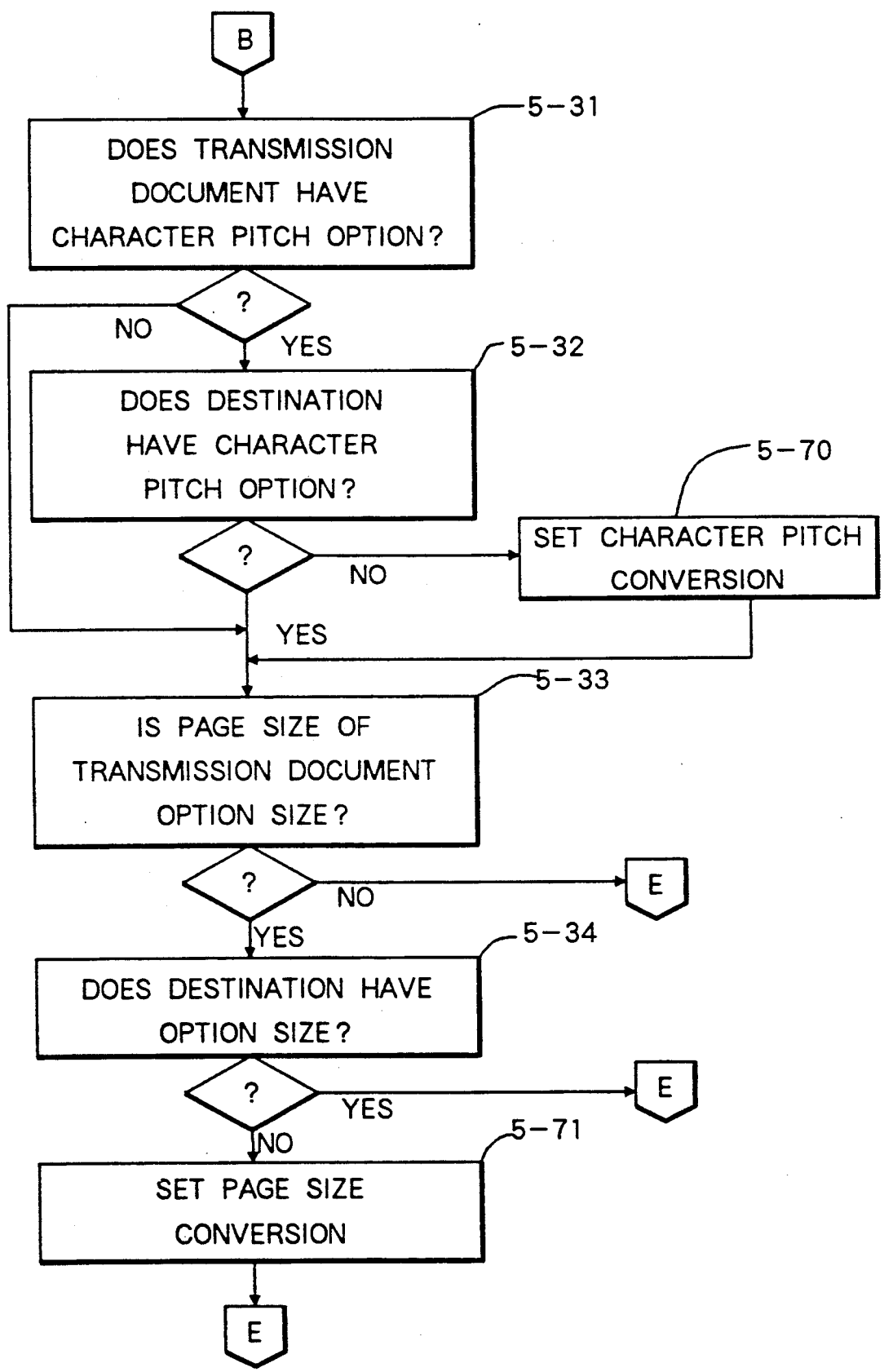
Figure 7E:
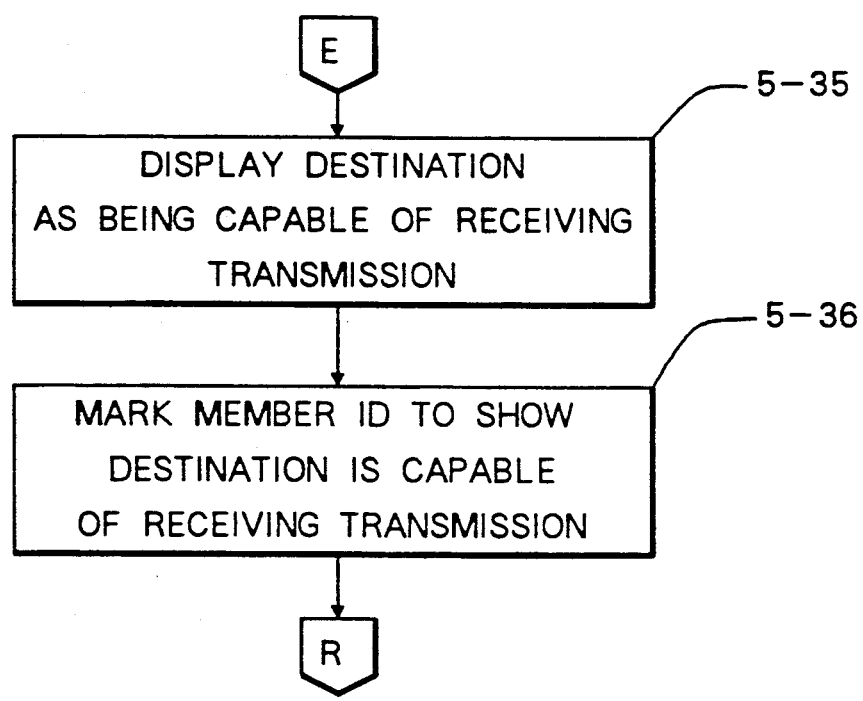
Figure 7F:
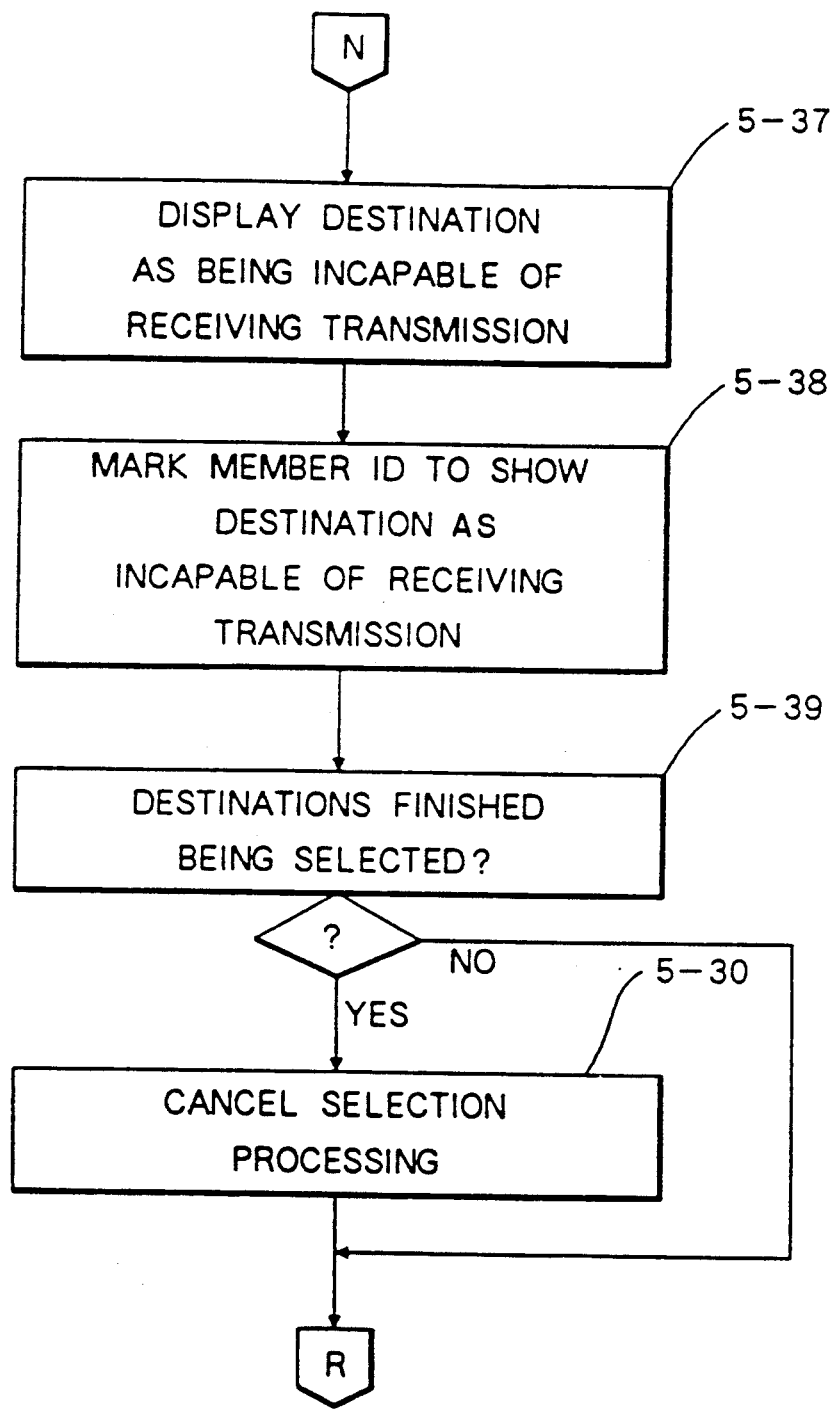
Figure 7G:
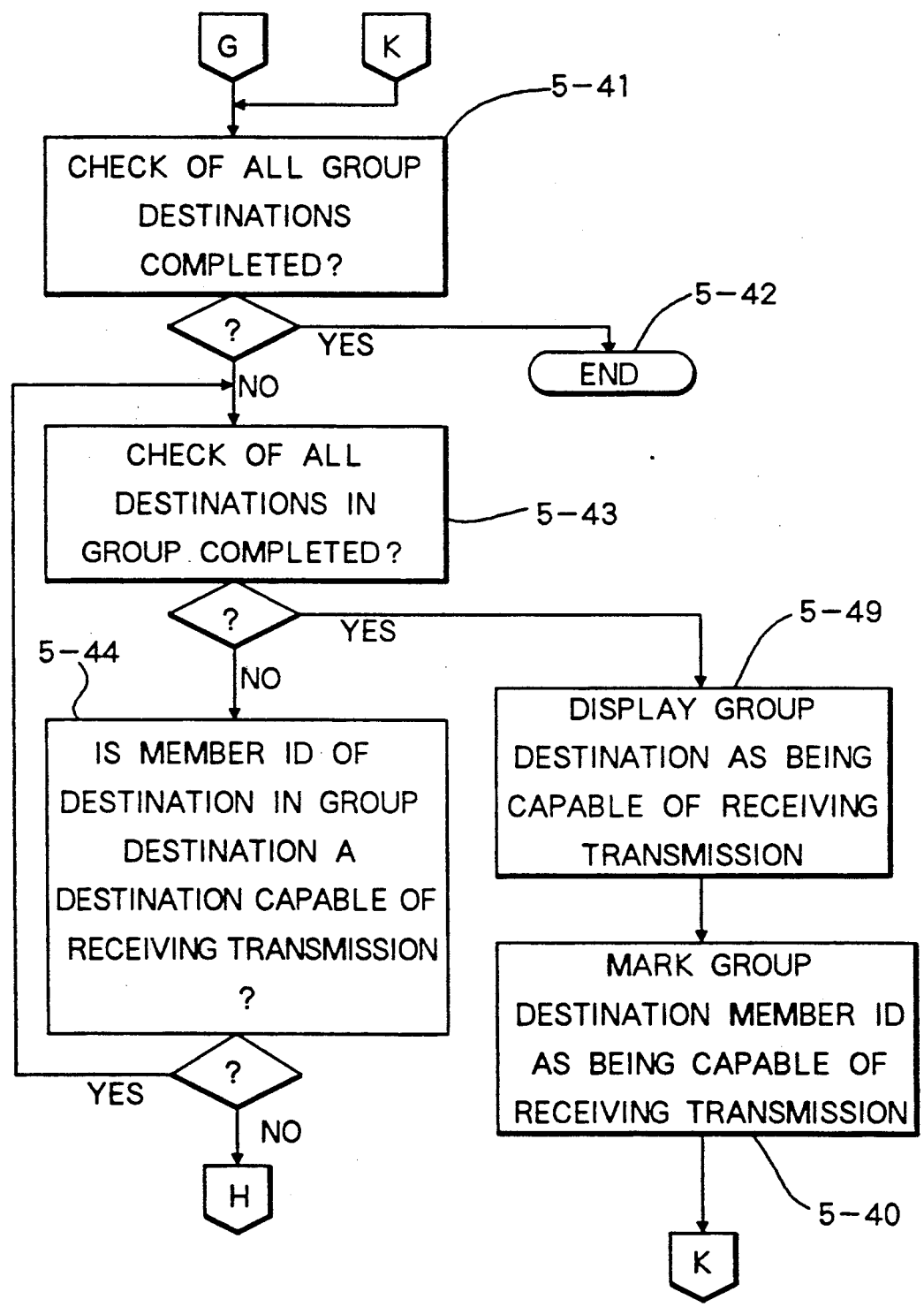
Figure 7H:
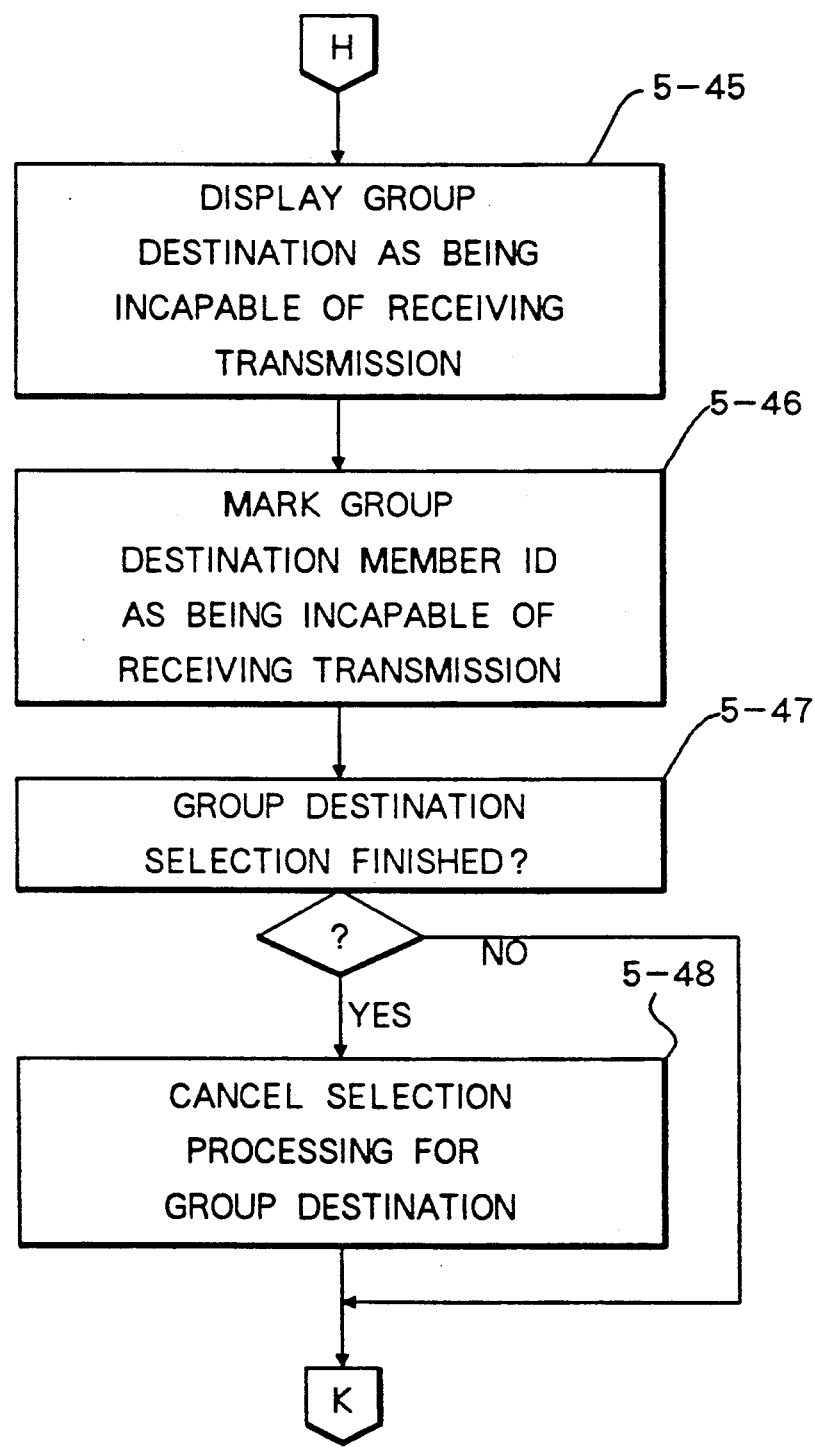
Figure 7I:
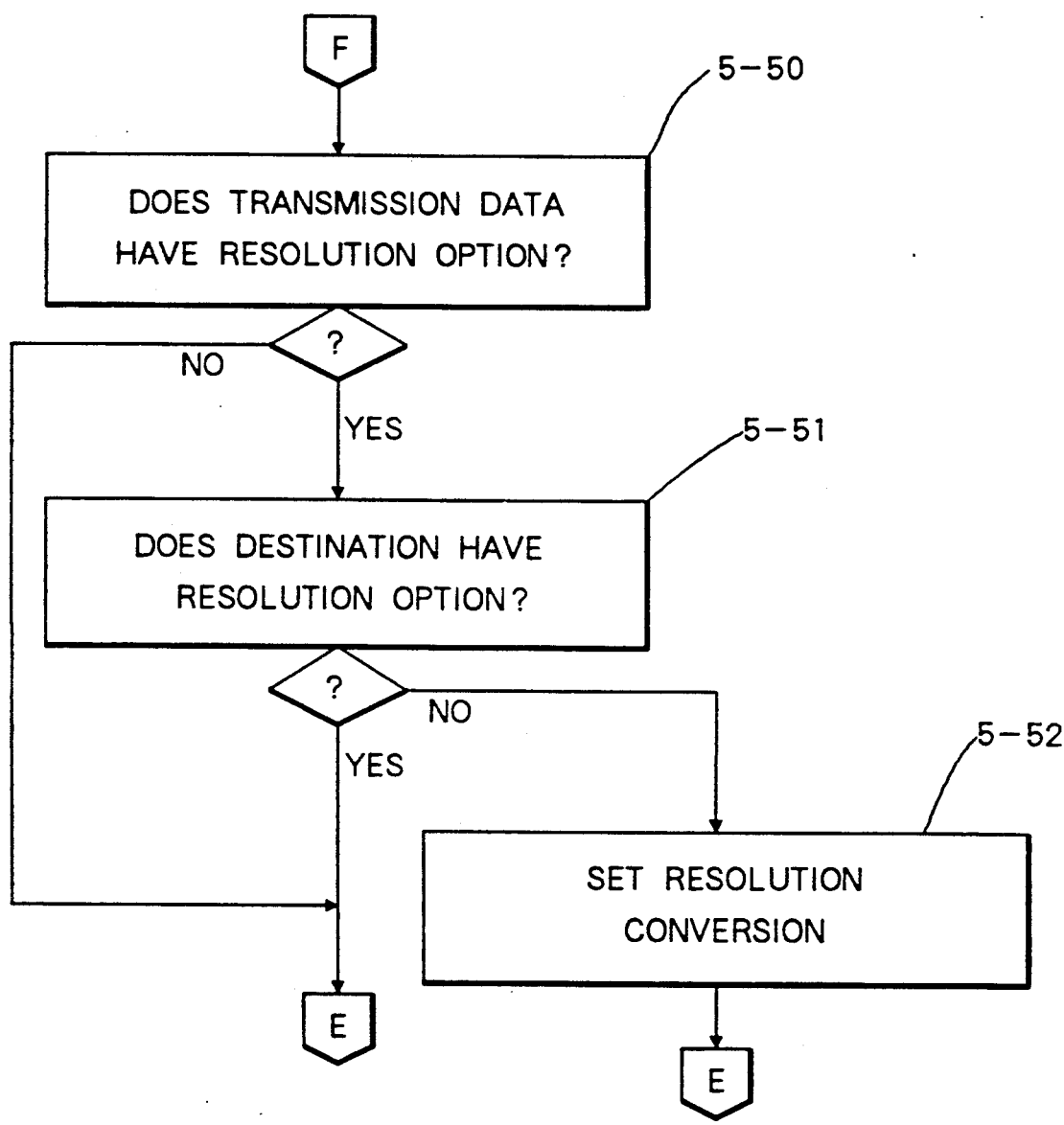
Figure 9A:
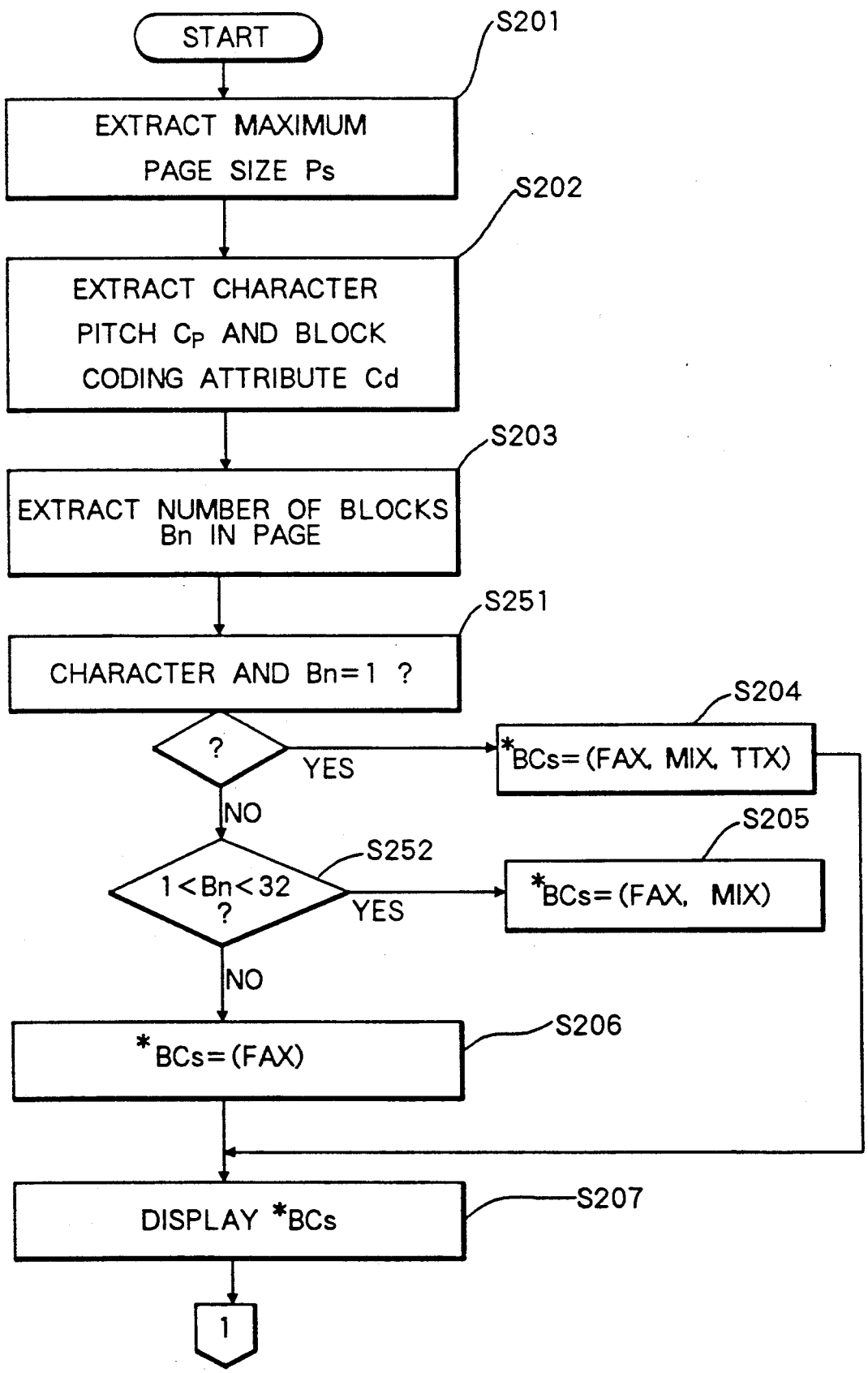
Figure 9B:
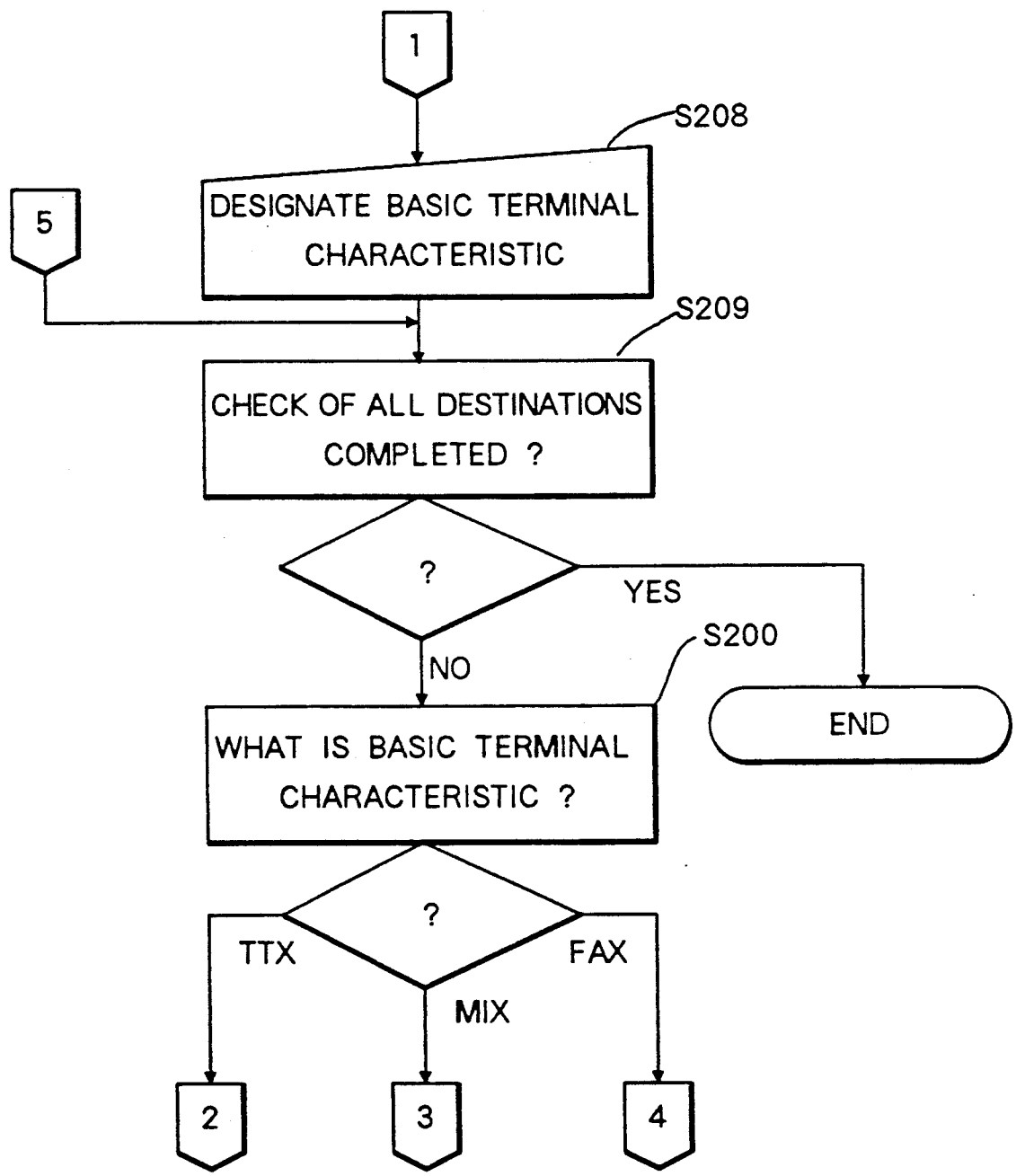
Figure 9C:
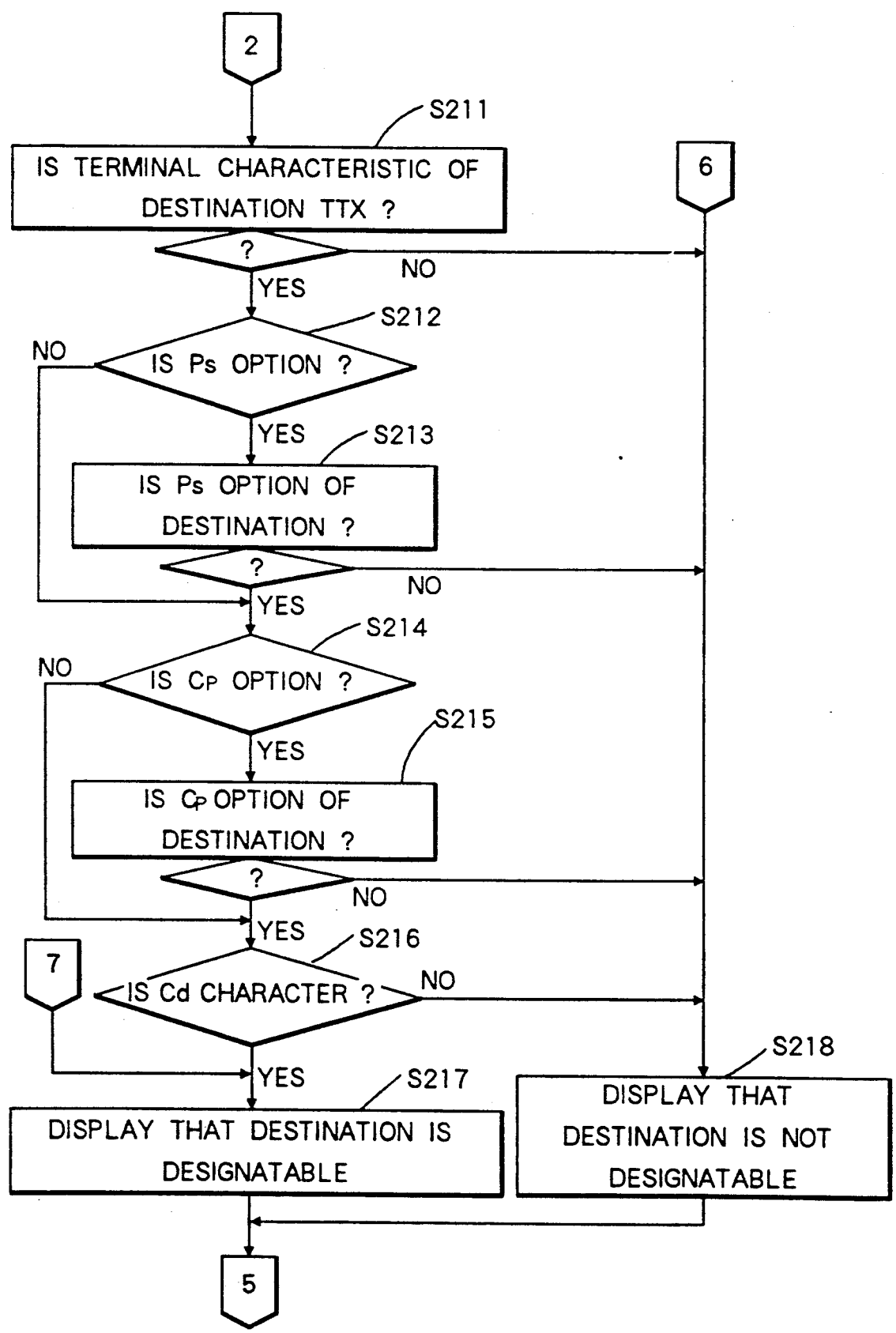
Figure 10A:
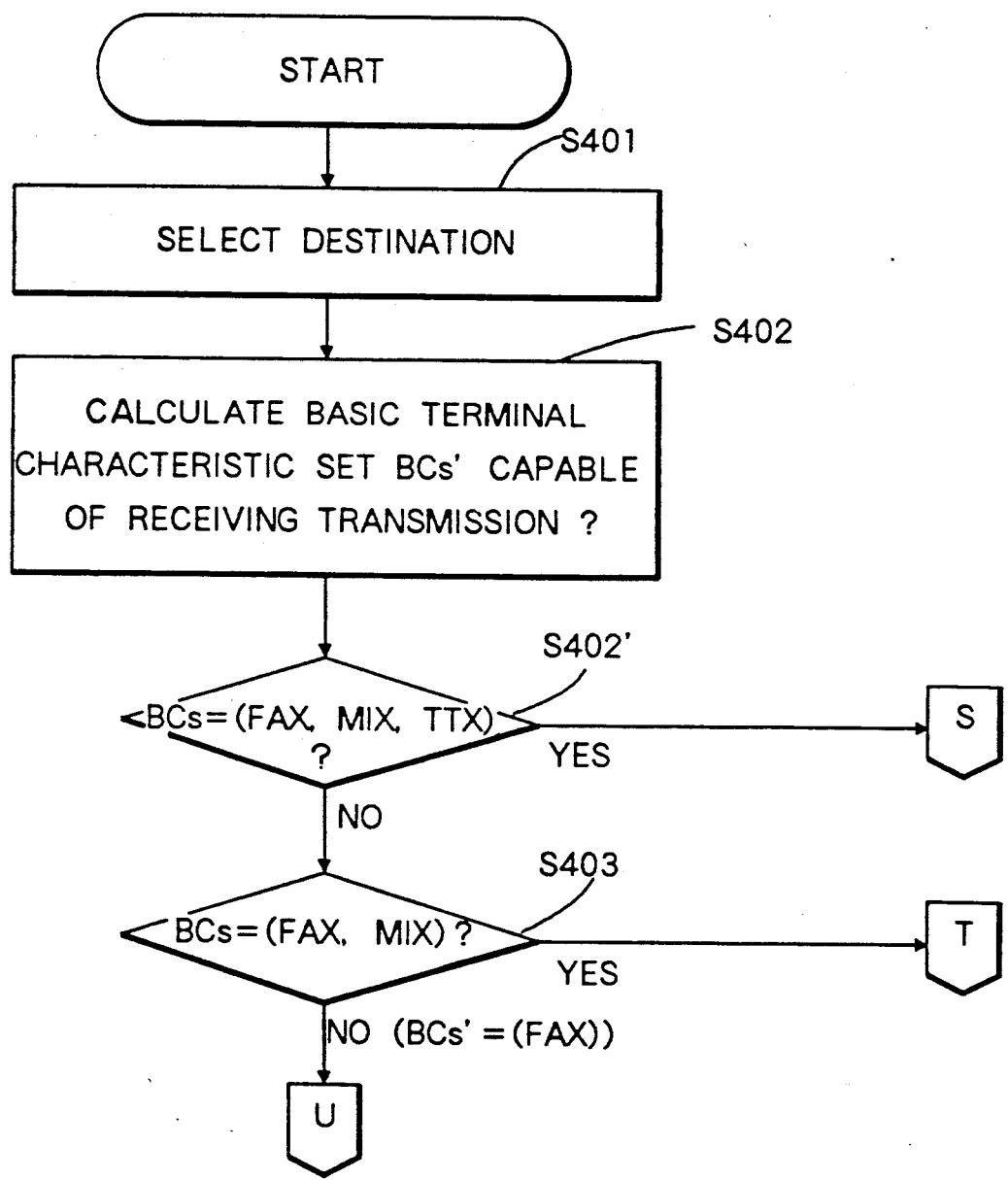
FIGS. 10A through 10D are flowcharts illustrating selection processing giving emphasis to transmission efficiency and resolution.
Figure 10B:
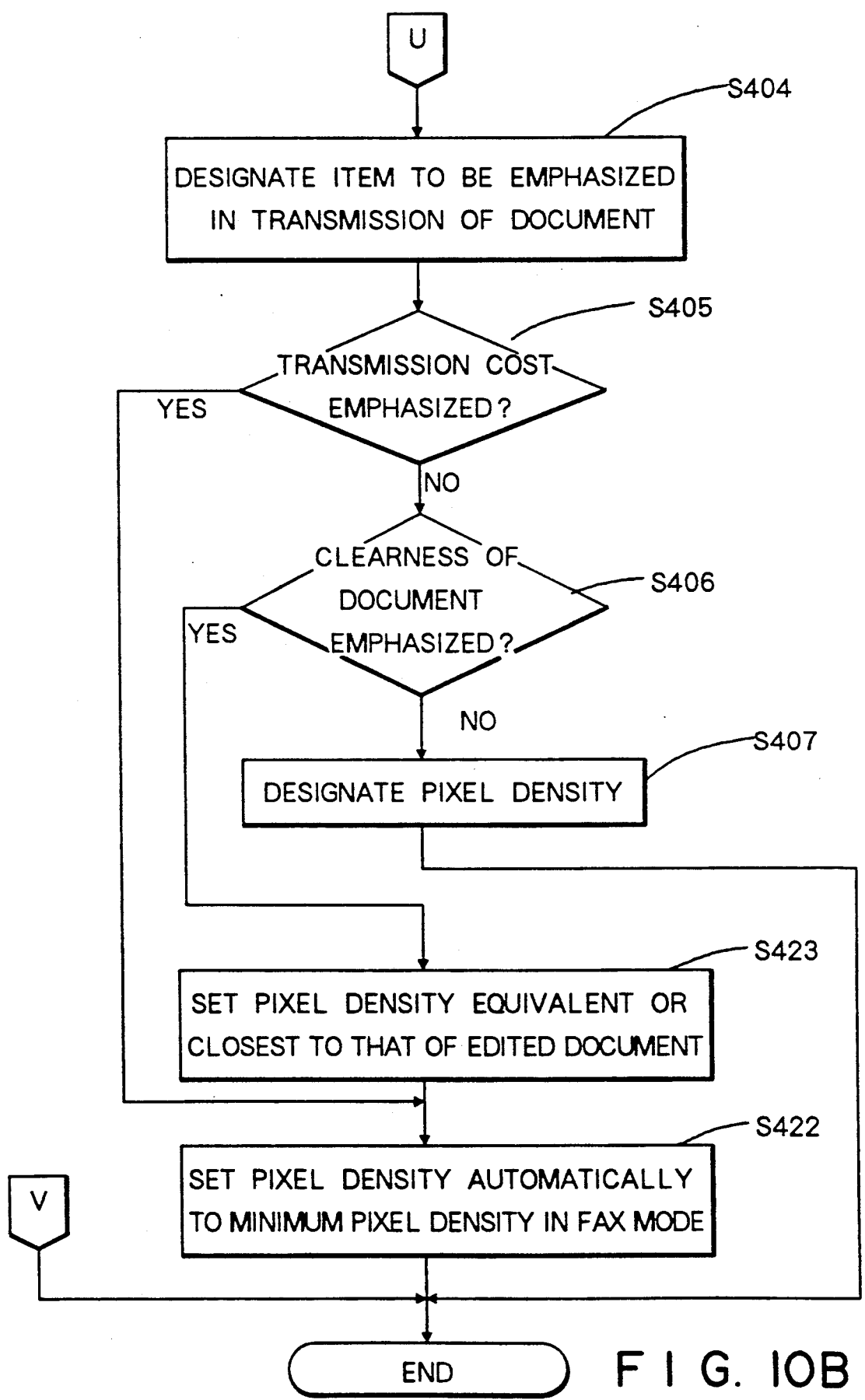
Figure 10C:
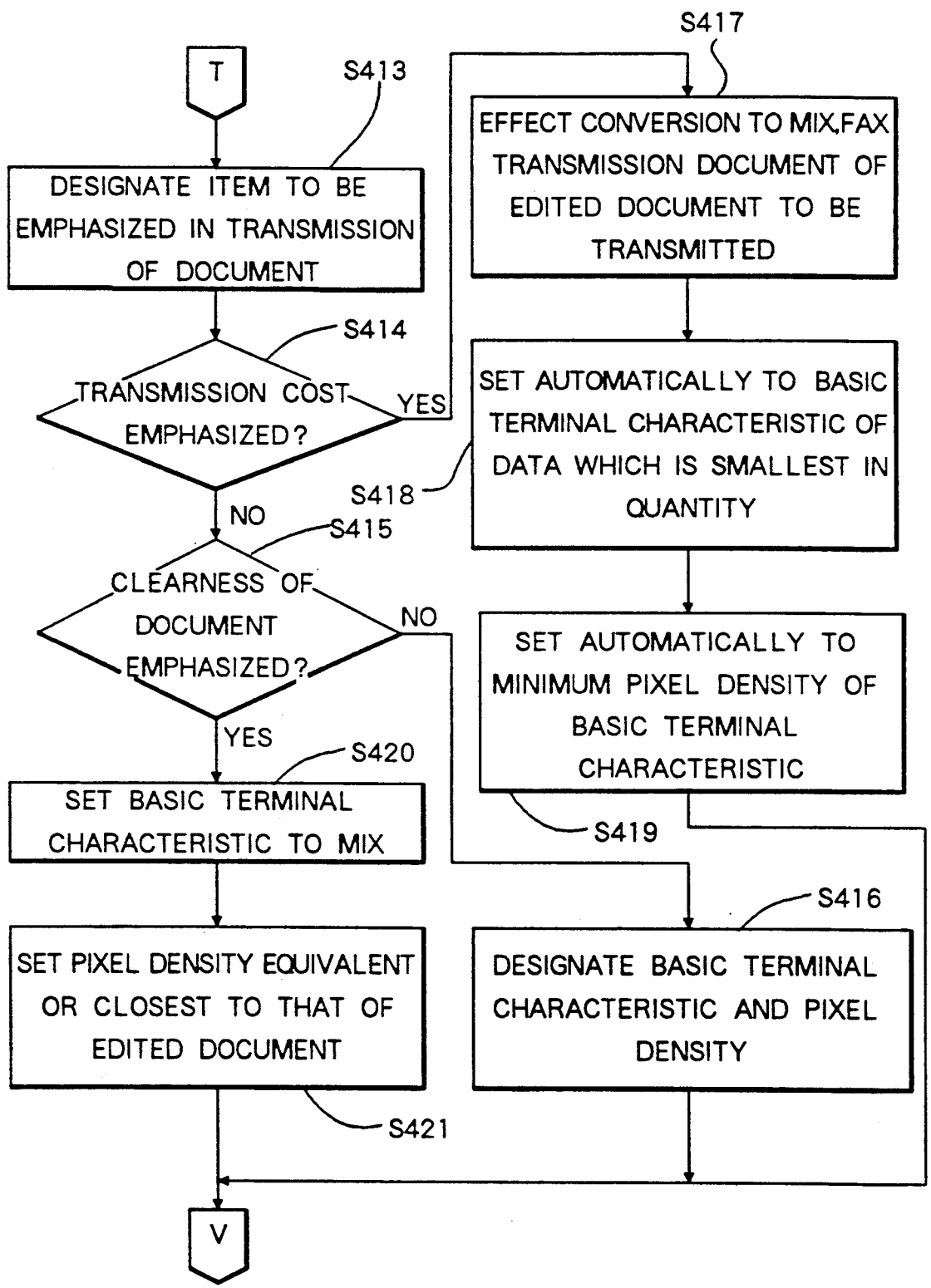
Figure 10D:
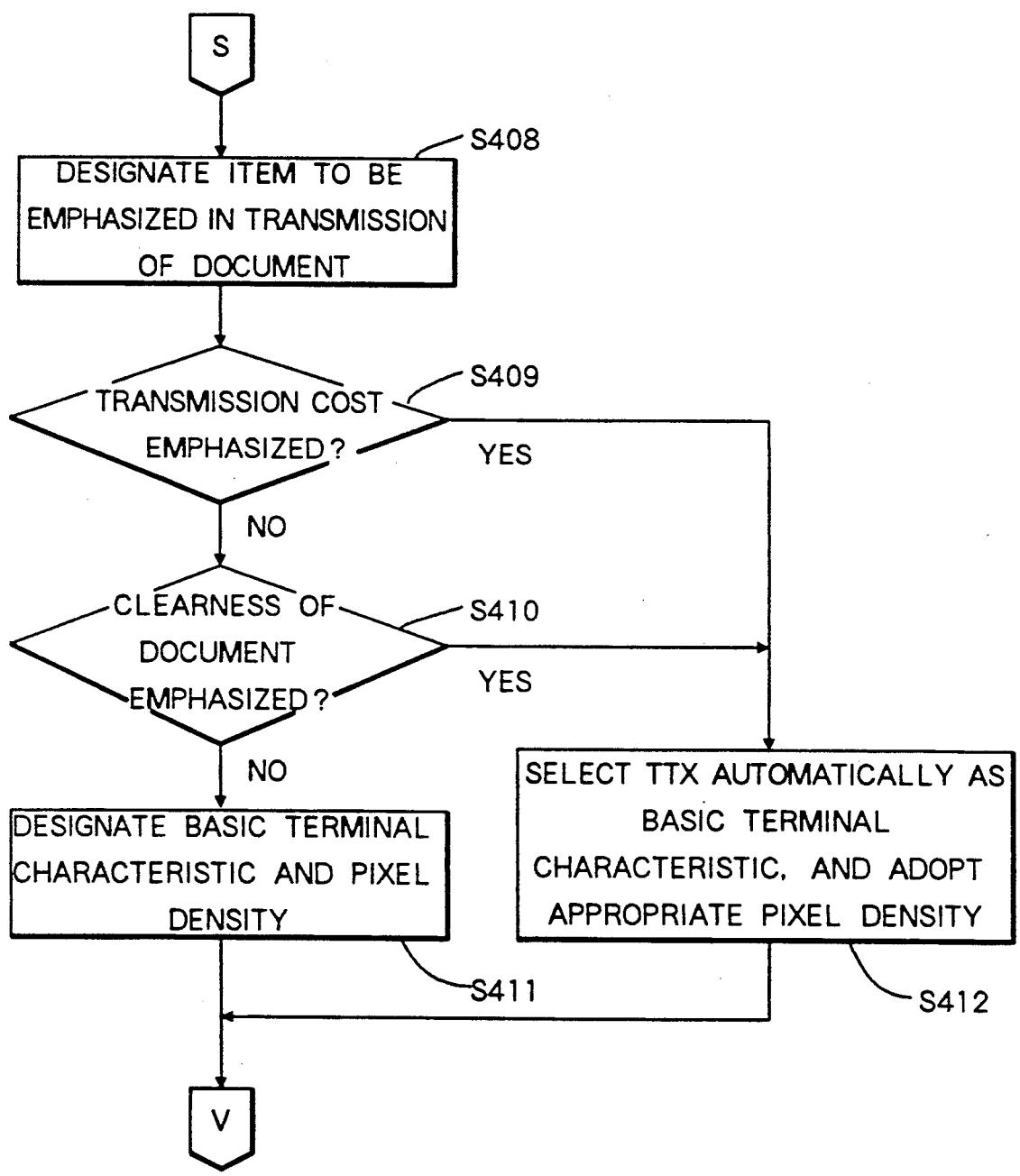

Step 3-1 in FIG. 5 calls for analysis of document format options. The processing performed at this step pre-converts an edited document desired to be transmitted or a document which has been received, thereby preparing the data shown in FIG. 6. This is followed by a step 3-2 at which there is selected a convertible format set by performing defaulting in the convertible format with the results being displayed on the CRT 60 in the section 12 shown in FIG. 3. Thus, whether the data to be transmitted is MIX data composed of a mix of character codes and images, FAX data consisting of image data only or TTX data composed of character code data only, is displayed. In the embodiment illustrated, the information prepared indicates MIX data. Next, a step 3-3 calls for the data prepared at the step 3-1 and shown at 4-1 through 4-4 in FIG. 6 to be submitted to a transmittable destination selection (i.e. selection of destinations to which a transmission is capable of being made) based on 2-1 through 2-80 of FIG. 4, with the results being displayed in picture areas 13 through 15 of FIG. 3. Here, a designatable party is indicated against a white background and an undesignatable party is indicated against a shaded background so that the operator can ascertain which parties cannot be designated. Next, a step 3-4 calls for the system to wait for input of an instruction from the operator using the keyboard 61 or the pointing device 62. When an instruction is input, it is determined whether the instruction is a destination instruction at a step 3-6, a conversion format instruction at a step 3-5 or a transmission instruction at a step 3-7. If the instruction is a destination instruction, destination selection display processing is executed at a step 3-8 to present a back-lighted display of the destination instructed. If the instruction is conversion format instruction, the conversion is made to the conversion format, and then a transmittable destination selection is made at a step 3-9. If the instruction is a transmission instruction, a transmission file is sent to and registered on the hard disc device at a step 3-11. If the input made by the operator in the transmission registration of the file is indicative of immediate transmission, processing for transmitting the file is performed immediately after registration. If the input made by the operator in the transmission registration of the file is indicative of transmission to be made at a certain designated time, the processing for transmitting the file is executed when the designated time arrives.

If a destination designated at the step 3-5 appears against a shaded background on the CRT screen, the input is invalidated since this destination is incapable of receiving a transmission.

FIG. 7A through 7I are detailed flowcharts of processing for the transmittable destination selection performed at step 3-3 of FIG. 5. The particulars for selecting a destination to which a transmission can be made will now be described based on the flowchart of Fig. 7A through 7I.

A step 5-11 calls for a determination as to whether a check of all destinations has been completed. The program proceeds to a step 5-12 if the answer is NO and to a step 5-41 is the answer is YES.

Individual destinations are checked successively from step 5-12 onward. First, at step 5-12, the destination data indicated in the member section 15 and one-touch section 14 of FIG. 3 are read out of the PMEM 23, and it is determined whether the terminal at the destination possesses the conversion format of the data attempting to be transmitted. For example, if the edited transmission data is MIX data, whether or not the terminal at the destination possesses a MIX function is checked by referring to destination-related information stored on the hard disc 50. If a destination read at the step 5-12 does not possess the conversion format of the transmission data, the program proceeds from step 5-12 to a step 5-37 at which the relevant destination displayed on CRT 60 in FIG. 3 is made to appear against a shaded background to show that transmission to this destination is impossible. This is followed by a step 5-38 at which the member ID is marked non-transmittable to indicate that transmission to this destination is not possible. Next, it is verified at a step 5-39 whether the destination to be checked next has already been checked. If the answer is YES, a flag concerning destination selection processing is removed and the program returns to the step 5-11.

When destination selection is thus terminated at the step 5-30, a decision is rendered at the step 5-11 that all destinations have been checked.

If it is decided at the step 5-12 that a read destination possesses the conversion format of the transmission data, then the program proceeds to a step 5-13 at which it is determined whether the read destination possesses an option function. If the answer received at the step 5-13 is NO, no-option data is set in the member ID. At a step 5-35, the destination is displayed against a white background at the relevant destination section of the display on CRT 60 of FIG. 3 to show that data can be transmitted to this destination. This is followed by a step 5-36 at which the member ID is marked to show that the destination is capable of having data transmitted thereto. The program then returns to the step 5-11. It should be noted that when the program returns from step 5-36 to step 5-11, processing similar to that of steps 5-39, 5-30 is executed.

If the decision rendered at the step 5-13 is that the destination has a conversion format option function for the data to be transmitted, the specific data of the conversion format possessed by the destination is discriminated from step 5-14 onward.

At the step 5-14, detailed terminal information containing the option information of the corresponding destination are read. At steps 5-15 and 5-16, the conversion format of the transmission data is checked again in order to discriminate the option function corresponding to the conversion format of the data. The program proceeds from step 5-15 to a step 5-21 if the transmission data is indicative of MIX to a step 5-50 if the transmission data is indicative of FAX, and to a step 5-31 if the transmission data is indicative of TTX.

When it is decided that the data to be transmitted is MIX data and the program proceeds to the step 5-21, it is determined whether the character pitch or character code of character data in the data to be transmitted is an option function, namely whether the character pitch has been modified. If this option function is available, it is determined at a step 5-22 whether the destination also possesses the option function of the data to be transmitted. If the destination does not possess this option function, then the program proceeds to a step 5-60. Here, information indicating that the character pitch or character code of the transmission data must be converted into a form receivable at the destination is set in the member ID of the relevant record. This is followed by a step 5-61. Similarly, the program proceeds to the step 5-61 if the destination is found to possess the option function at the step 5-22.

The step 5-61 calls for a determination as to whether the resolution of the image data in the transmission data is an option, namely whether the image data attempting to be transmitted is 400 BPI. If this option is available, then it is determined at a step 5-62 whether the destination also possesses this option. If the terminal at the destination does not possess this option function, then information indicating that image data resolution conversion is required is set in the member ID at a step 5-63, after which the program proceeds to a step 5-23. If the image data in the transmission data does not possess the above mentioned option function (NO at step 5-61), the program proceeds to the step 5-23. If the destination possesses the option function (YES at step 5-62), the program likewise proceeds to the step 5-23. This step calls for a determination as to whether the number of blocks in a page of the transmission data exceeds "32". If the answer is NO, the program proceeds to a step 5-35. If the answer is YES, the program proceeds to a step 5-24 at which it is determined whether the number of blocks (the number of objects) Ns of the transmission data is less than the number of objects Nr processable at the destination. If Ns is found to be less than Nr, the program proceeds to a step 5-35. If Ns is found to be equal to or greater than Nr, the program proceeds to a step 5-25. It is determined at the step 5-25 whether the destination has a facsimile function. If the destination does have this function, the program proceeds to a step 5-50; if it does not, the program proceeds to a step 5-37.

It should be noted that the number "32" serving as the reference in step 5-23 signifies the maximum number of blocks in one page of mixed data according to CCITT recommendations.

The reason for setting the information indicating the need for a conversion in the member ID at steps 5-60 and 5-63 is to inform the operator, at designation of the destination, of the fact that the characteristics of the data to be transmitted to the basic terminal 12 of the CRT 60 (FIG. 3) require conversion (conversion of MIX data to FAX data. However, it is permissible to display in advance those destinations requiring a conversion in such a manner that these destinations are distinguishable from others. Further, since all of the transmission data are transmitted as image data when the number of transmission data blocks is greater than the number processable at the destination, the facsimile function at the destination is checked. In case of a terminal having a MIX reception mode, the destination ordinarily will have a G4 facsimile reception function.

When the transmission data are FAX data and the program proceeds from step 5-16 to step 5-50, it is determined whether the resolution of the image data in the transmission data is an option function. If it is an option function, the program proceeds to a step 5-51 at which it is determined whether the destination possesses this option function. If the answer is NO, information indicating that the resolution of the transmission data requires a conversion is set in the member ID at a step 5-52, just as at the step 5-63, and the program then proceeds to the step 5-35. If the transmission data does not have this option function, the program proceeds from the step 5-50 to the step 5-35. If the destination possesses this option function, the program proceeds from the step 5-51 to the step 5-35.

When the transmission data are TTX data and the program proceeds from step 5-16 to step 5-31, it is determined whether an option function is being used in the character pitch and character code of the character code data in the transmission data. If the option function is being used, the program proceeds to a step 5-32 at which it is determined whether the destination possesses this option function. If the answer is NO, information indicating that the transmission data requires a conversion is set in the member ID at a step 5-70, just as at the step 5-60, and the program then proceeds to the step 5-35. If the transmission data is not using this option function, the program proceeds from the step 5-31 to the step 5-33. If the destination (the destination selected for the purpose of a check) possesses this option function, then the program proceeds from the step 5-32 to the step 5-33.

The step 5-33 calls for a determination as to whether the page size of the transmission data is an option size. If it is an option size, it is determined at a step 5-34 whether the destination possesses a reception function for this option size. If the answer is NO, information indicating the need for revising the page size is set in the member ID at a step 5-71 and the program proceeds to the step 5-35. If the page size of the transmission data is not the option size, then the program proceeds from the step 5-33 to the step 5-35. If the destination possesses the function for receiving the option size, the program proceeds from the step 5-34 to the step 5-35.

In the foregoing processing, destinations in the one-touch section 14 are checked in the same manner as the member destinations. When all destinations have thus been checked, the program proceeds from the step 5-11 to a step 5-41. Group 13 (FIG. 3) is checked from steps 5-41 onward.

The step 5-41 calls for a determination as to whether a check of all group destinations has been completed. If the answer is NO, a group to be checked is selected at a step 5-43, and it is determined at this step whether a check of all destinations in the group has been completed. This is followed by a step 5-44 at which member ID's of destinations are read out successively in the order of the destinations of the member reference table 2-6 shown in FIG. 4, it is determined whether the member ID's have a marking indicating that they can be transmitted to, and it is judged whether the terminal characteristics of all destinations in the group agree. If there is a destination to which a transmission cannot be made, the program proceeds from the step 5-44 to a step 5-45 at which this destination in the group is displayed on the CRT 60 (FIG. 3) against a shaded background to indicate that this destination in the group cannot receive a transmission. This is followed by a step 5-46, at which the group ID 2-2 of the group destination is marked to show that it cannot receive a transmission. The program then proceeds to a step 5-47.

When it is detected at the step 5-44 that a destination among the destinations in a group has a terminal characteristic different from the group terminal characteristic 2-5, this destination is erased from the member reference table 2-6. This is to prepare for a case where a member reference table is created erroneously when the group record is registered or revised.

When the program proceeds from the step 5-46 to a step 5-47, the next group destination is selected, and it is determined whether the selected group destination has already been checked. This is accomplished by determining whether a group ID has been marked to show that it can or cannot receive a transmission. (Whether a check of all destinations has been completed is determined by discriminating at the time of a member check whether a member ID has been marked as being capable or incapable of receiving a transmission.) If the destination of the selected group has already been checked, the group check selecting operation is cancelled at a step 5-48 and the program returns to the step 5-41.

If it is judged at the step 5-43 that a check of all destinations in a group has been completed, then, in order to indicate that a group destination selected for the check is capable of being transmitted to, the group destination corresponding to the group 13 is displayed against a white background on the screen of the CRT 60 (FIG. 3), thereby showing that a transmission is possible. Next, the group ID of this group destination is marked to show that a transmission is possible, and the program returns to the step 5-41.

The group check of steps 5-41 through 5-48 is executed whenever the operator alters the terminal characteristic of each individual destination. If the terminal characteristic of a destination differs from the terminal characteristic of the group owing to the alteration of the terminal characteristic, the destination is automatically erased from the group.

The above-described embodiment has the following advantages:

First, a user can easily designate a destination for transmission even without an understanding of communications techniques.

A document desired to be transmitted is prevented from being sent accidentally to a destination incapable of receiving the transmission. This makes it unnecessary to pay a fee because of needless use of a telephone line or the like.

The merits of a mixed mode terminal, namely the high transmission efficiency and the clearness of a received document, can be put to excellent use without complicating the user's task.

In the foregoing embodiment, destinations to which a transmission can and cannot be made are displayed in distinguishable fashion depending on the characteristics of the edited data (data attempting to be transmitted) per se. For example, if the data to be transmitted are MIX data, the terminal at a destination must be a mixed mode terminal. In other words, if a destination to which a transmission is desired to be made is e.g. an ordinary facsimile device, a display is made indicating that the data cannot be transmitted as is. By inputting an instruction which calls for a display of the details of the terminal characteristic at the destination to which a transmission is desired to be made, the operator is capable of verifying whether this terminal characteristic is that of a facsimile device, teletex device or some other device.

In any case, the processing of FIGS. 7A through 7I is re-executed after the operator converts all of the edited MIX data into image data.

Accordingly, if the data attempting to be sent is MIX data, the transmission is possible regardless of whether terminal characteristics are indicative of MIX or FAX. Therefore, a second embodiment of processing will now be described with reference to FIGS. 9A through 9E and Figs. 10A through 10D in which a destination which satisfies this requirement is displayed against a white background.

According to this second embodiment, when a document to be transmitted is designated and an instruction is given indicating the desired destination, maximum page size Ps (i.e. size A4, B5, etc.) is calculated from among the pages of the document (step S201). Next, as steps S202 and S203, the character pitch Cp and the coding attribute of each block (i.e. pattern or code) are extracted and so is the maximum number of blocks Bn.

This is followed by a step S251 at which it is determined whether the maximum number of blocks Bn of the page of interest is "1" and whether the coding attribute is a character code, namely whether the entirety of the page of interest is composed of character codes (characters). If the answer received at the step S251 is YES, then the terminal characteristic BCs of the destination is such that BCs={FAX, MIX, TTX}. In other words, a document receiving a YES answer at the step S251 is transmittable even if the other party's terminal is a facsimile device, a mixed mode facsimile device or a teletex device.

Next, a step S252 calls for a determination as to whether the maximum number of blocks Bn satisfies the relation $1 < Bn < 32$. If the answer is YES, the terminal characteristic BCs is such that BCs={FAX, MIX}. If a NO answer is received at the step S252, namely if the number of block Bn is greater than 32, then a transmission in the mixed mode is not possible, and hence, the terminal characteristic BCs is such that BCs={FAX}.

When a destination terminal element to which a prepared document can be transmitted has thus been confirmed via the steps S204–S206, the terminal characteristic element 12 of the designatable party is displayed at a step S207. For example, when the terminal characteristic BCs is {MIX}, a display is presented as shown in the basic terminal characteristic section 12 of FIG. 3. When BCs ={FAX, MIX} holds, a display is presented showing that a transmission is possible in either case. Thus, the operator can readily comprehend the form of data about to be transmitted.

Next, at a step S208, the operator designates the basic characteristic to be transmitted. For example, the operator specifies whether the created document is to be sent in the mixed mode or facsimile mode. Note that FIG. 3 illustrates an instance in which only the mixed mode is designatable (see the basic terminal characteristic section 12). Also, designations can be made by a cursor moved on the display screen by operating a pointing device such as a mouse or by inputs made from a keyboard.

The program proceeds from the step S208 to a step S209 at which it is determined whether a check of all destinations has been completed. If the answer is NO, the program proceeds to a step S200 at which the terminal of the party capable of receiving a transmission is matched based on the transmission characteristic designated at the step S208.

When the designated transmission mode is the teletex (TTX) mode, processing from a step S211 onward is executed. The step S211 calls for a determination as to whether the terminal characteristic 2-23 of the other party's terminal possesses the TTX basic characteristic. If the answer is NO, then the program proceeds to a step S218 where a display is presented to the effect that a transmission cannot be made to the designated destination. If a YES answer is received at the step S211, on the other hand, it is determined at a step S212 whether the page size Ps of the document attempting to be transmitted is an option size greater than the basic teletex page size. If the answer at the step S212 is NO, then the program proceeds to a step S214. Described here will be a case where a YES answer is received, namely a case where a transmission is made in the basic page size.

At this time, then, the program proceeds to a step S213 at which it is determined, based on terminal characteristic 2-23, whether the destination terminal corresponds to the option size. If the answer is NO, then the program proceeds to a step S218 at which a display is presented to the effect that a transmission is not possible. If the answer is YES at the step S213, then the program proceeds to a step S214 at which it is determined whether the character pitch Cp of the transmission data is the option 12 (characters/inch). If the answer is YES, then it is determined at a step S215 whether the terminal at the destination has this option. Finally, it is determined at a step S216 whether the document to be transmitted is characters. If the answer is NO, then transmission by teletex naturally is impossible and the program proceeds to a step S218 at which the appropriate display is made.

If a YES answer is received at the step S216, the program proceeds to a step S217 at which a display is presented to the effect that a transmission is possible. It should be noted that a destination displayed against a shaded background in each destination section is not capable of receiving a transmission. This means that the other destinations are capable of receiving a transmission. In addition, a destination designated by the operator (naturally this destination is required to be one which can receive a transmission) is displayed by reversing the black and white colors.

If the decision rendered at the step S200 is that the transmission mode is the mixed mode, processing is executed from step S220 onward.

Specifically, it is determined at the step S220 whether the terminal at the destination is a mixed mode terminal. If the answer is YES, then it is determined at a step S221 whether there is a Cp option. If the answer at the step S221 is YES, then it is determined at the step S222 whether the destination terminal has the Cp option.

If the transmission mode is the facsimile mode, it is determined at a step S224 whether the terminal at the destination is a facsimile terminal.

As the result of the foregoing processing, it is possible for the operation to visually ascertain, prior to line connection, whether a document can be transmitted to the destination. The operator can also readily comprehend whether the form of the data to be transmitted is MIX or FAX.

In the processing described above, the basic terminal characteristics of the transmission data are displayed at the step S207. However, it is possible to adopt an arrangement in which there is displayed a summary of parties which are and are not capable of receiving a transmission, depending upon the terminal characteristics. For example, when the terminal characteristic is such that BCs={MIX, FAX} holds, a list of parties capable of receiving a transmission can be displayed merely by modifying at least the transmission data. This is very convenient.

A characterizing feature of mixed mode terminal equipment is that when a document is transmitted, a selection can be made to emphasize either clearness or transmission efficiency.

FIGS. 10A through 10D show a flowchart illustrating a function added to the foregoing embodiment in such a manner that the clearness of transmission data and the transmission efficiency thereof in case of a mixed mode transmission terminal can be utilized without complicating the operator's task. It should be noted that this flowchart is a continuation from the step S209 in FIG. 9B.

When a destination capable of receiving a transmission is designated (as by using the abbreviated dialing code "*02" shown in FIG. 3) at a step S401, a basic terminal characteristic which is an element of a set of basic terminal characteristics registered at a destination is extracted from the BCs obtained in the course of processing of FIG. 9A through 9E, and a partial set BCs' of the basic terminal characteristic set (FAX, MIX, TTX) is calculated at a step S402. Hereinafter, a case will be described in which this BCs' is (FAX, MIX). The processing to be described in this connection starts with a step S413.

The step S413 calls for the operator to decide whether he wishes to send the data at a low transmission cost, at a high resolution or in some other way. If the operator wishes to lower transmission cost, then the program proceeds to a step S417 at which the document is converted into a MIX document and a FAX document. As for pixel density, which is one parameter transferred in the conversion, the smallest value, inclusive of the option, is selected from among a variety of pixel density attribute values of a presentation function possessed by the destination. (Since there are cases where the basic terminal characteristics for MIX and FAX differ from each other, the selection is made from among a variety of pixel densities corresponding to the basic terminal characteristics for MIX in case of a MIX document and from among a variety of pixel densities corresponding to the basic terminal characteristic for FAX in case of a FAX document.)

The FAX data or MIX data, whichever is smallest in quantity, is selected one block at a time, and the corresponding basic terminal characteristics are set automatically as the basic terminal characteristics at the time of transmission (step S418). From among the variety of pixel densities corresponding to the designated basic terminal characteristics, the lowest is set (step S419), and the operator is notified of this.

If the clearness of the outputted image is to be maximized, on the other hand, the basic terminal characteristic is set to MIX at a step S420. Next, at a step S421, the pixel density is set to a value equivalent or closest to the pixel density used in the transmission data from among the variety of pixel densities corresponding to the MIX at the destination. If neither transmission cost nor clearness is emphasized in the foregoing, the BCs' and variety of the pixel densities at the destination is presented to the operator, who is made to set the basic terminal characteristic and the pixel density.

If BCs' is (FAX, MIX, TTX), namely if a created document is composed solely of character information, processing is executed from a step S408 onward. If transmission cost or clearness is emphasized at steps S408 through S410, the transmission mode is made TTX at a step S412. If neither is emphasized, the pixel density is specified at a step S411, and the transmission is made in the facsimile or mixed mode.

If BCs' is (FAX), on the other hand, processing is executed from a step S404 onward. That is, when transmission cost is emphasized (YES at step S405), pixel density is minimized at a step S422. When clearness is emphasized (YES at step S406), a pixel density is set at a step S423 which is equivalent or closest to the edited pixel density.

Basically, in this embodiment, various data (e.g. member name, terminal characteristic and the option function thereof) are input and registered using the keyboard when registering information related to each destination. It is permissible to adopt an arrangement in which, if an unregistered destination is designated to receive a transmission, a message is displayed inquiring as to whether information relating to the destination is to be registered. Even if the operator does not know the terminal characteristic of the destination, that is, irrespective of whether a transmission is possible or not, the terminal characteristic of the other party can be identified based on the protocol after line connection. Therefore, registration can be performed automatically merely by inputting a member's name or the like.

In accordance with the present embodiment as described above, a destination for a transmission can be designated in a simple manner without knowledge of communication techniques. In addition, inadvertent transmission of a document which cannot be received is avoided, so line utilization costs can be reduced.

It is also possible for the operator to easily select improved transmission efficiency or enhanced clearness of a received document, this capability being one of the merits of a mixed mode terminal.

Further, in accordance with the embodiment, in order to distinguish between a party capable of receiving a transmission and a party incapable of receiving the transmission when a document is to be transmitted, one of the parties is displayed against a shaded background. However, so long as these two parties can be distinguished from each other, the invention is not limited to such an arrangement.

Though the present invention has been described in connection with embodiments wherein the invention is applied to mixed mode terminals, the invention is not limited to mixed mode terminals but can be applied to all data communications systems capable of communicating with plural types of terminals.

As many apparently widely different embodiments of the present invention can be made without departing from the spirit and scope thereof, it is to be understood that the invention is not limited to the specific embodiments thereof except as defined in the appended claims.

ADVANTAGES OF THE INVENTION

In accordance with the present invention as described above, data not receivable by another party can avoid being sent, thus making it possible to reduce line utilization fees. In addition to this advantage, parties which can and cannot receive transmitted data because of the form of the data are capable of being displayed so as to be distinguishable from each other, and whether or not a transmission is possible can be readily comprehended based on the form of the data attempting to be transmitted. Moreover, in another embodiment, an additional advantage is that the form of data to be transmitted can be readily comprehended.

What is claimed is:

1. A data communication system capable of communicating with communication terminal equipment of a plurality of types through a communication line, comprising:
   memory means which has previously stored information identifying a type of every terminal equipment, said types being of at least two types which communicate different types of data;
   designation means for designating a communicating party to which transmission data is to be transmitted; and
   control means for reading out from said memory means said information identifying the type of terminal equipment corresponding to the communicating party designated by said designation means, for discriminating whether the communicating party designated by said designation means is capable of receiving said transmission data based on said transmission data and information read out from said memory means, and for controlling transmission processing based on the result of the discrimination,
   wherein said control means terminates said transmission processing when the party designated by said designation means is incapable of receiving said transmission data before the transmission line is connected.

2. The date communication system according to claim 1, wherein said type of every terminal equipment contains first, second and third types.

3. The data communication system according to claim 2, wherein said first, second and third types are respectively mixed mode terminal equipment, a facsimile device and a teletex apparatus.

4. The data communication system according to claim 1, wherein said information stored in said memory means contains a data expression function of the terminal equipment of a communicating party.

5. The data communication system according to claim 1, further comprising a keyboard and wherein the transmission data contains document information input from said keyboard.

6. The data communication system according to claim 1, further comprising an image reader and wherein the transmission data contains image information input by said image reader.

7. The data communication system according to claim 1, further comprising a keyboard and an image reader, and wherein the transmission data is information consisting of a mix of document information input from said keyboard and image information input by said image reader.

8. The data communication system according to claim 1, further comprising alarm means for giving an indication that transmission processing has been terminated by said control means.

9. The data communication system according to claim 1, further comprising a line connectable to terminal equipment of a communicating party, wherein said control means makes it impossible to connect said line to the terminal equipment of the communicating party.

10. The data communication system according to claim 9, further comprising alarm means for giving an indication that transmission processing has been terminated by said control means.

11. The data communication system according to claim 1, further comprising registration means for registering, in said memory means, information identifying type relating to terminal equipment of a new party.

12. The data communication system according to claim 11, wherein said registration means is activated after communication is made with terminal equipment of a party other than one stored in said memory means, said registration means discriminating information identifying type of the terminal equipment of the party based on protocol during said communication and storing said information identifying type in said memory means.

13. A data communication system capable of communicating with communication terminal equipment of a plurality of types, comprising:
   memory means which has previously stored discriminating information to discriminate plural communicating parties and information identifying a type of terminal equipment of each of said plural communicating parties;
   display means for displaying said discriminating information stored in said memory means; and
   control means for discriminating whether each of said terminal equipment of each of said communicating parties is capable of receiving said transmission data based on the transmission data and information identifying type of terminal equipment stored in said memory means,
   wherein said control means controls said display means to distinguish between parties capable of receiving or not receiving said transmission data.

14. The data communication system according to claim 13, wherein said type of terminal equipment of each of said plurality of communicating parties contains first and second type which communicate different kinds of data.

15. The data communication system according to claim 13, wherein said display means displays information identifying the form of the transmission data.

16. The data communication system according to claim 13, further comprising:
   modifying means for modifying the form of the transmission data, and
   activating means for reactivating said display means and said control means when the form of the transmission data is modified by said modifying means.

17. The data communication system according to claim 13, further comprising second display means for displaying details of the stored information corresponding to a party displayed by said display means.

18. The data communication system according to claim 13, further comprising transmission start designating input means for selecting one party displayed by said display means and designating start of transmission.

19. The data communication system according to claim 18, wherein when a party designated by an input from said transmission start designating input means is incapable of receiving the transmission data, said input is invalidated.

20. The data communication system according to claim 18, wherein when a party capable of receiving the transmission data is designated by an output from said transmission start designating input means, said party is displayed so as to be distinguishable from other parties capable of receiving the transmission data.

21. The data communication system according to claim 18, further comprising registration means for registering, in said memory means, information identifying type relating to terminal equipment of a new party.

22. The data communication system according to claim 21, wherein said registration means is activated after communication is made with terminal equipment of a party other than one stored in said memory means, said registration means discriminating information identifying type of the terminal equipment of the party based on protocol during said communication and storing said information identifying type in said memory means.

23. A data communication system capable of communicating with communication terminal equipment of a plurality of types, comprising:
   memory means which has previously stored discriminating information to discriminate plural communicating parties and information identifying a type of terminal equipment of each of said communicating parties;
   first display means for displaying discriminating information of said plural communicating parties stored in said memory means;
   second display means for displaying a form of data to be transmitted;
   and
   control means for discriminating, based on the form of said transmission data and said information identifying the type of terminal equipment, whether the terminal equipment of each of said communicating parties is capable of receiving said transmission data, and controlling said first display means based on the result of the discriminations, wherein said control means controls said first display means to distinguish between parties capable of receiving or not receiving said transmission data.

24. The data communication system according to claim 23, wherein said type of terminal equipment contains at least first and second types which communicate data of different kinds.

25. The data communication system according to claim 23, further comprising transmission start designating input means for selecting one party displayed by said first display means and designating start of transmission.

26. The data communication system according to claim 25, wherein when a party designated by an input from said transmission start designating input means is incapable of receiving the transmission data, said input is invalidated.

27. The data communication system according to claim 25, wherein when a party capable of receiving the transmission data is designated by an input from said transmission start designation input means, said party is displayed in a display manner distinguishable from other parties capable of receiving the transmission data.

28. The data communication system according to claim 23, further comprising registration means for registering, in said memory means, information identifying type relating to terminal equipment of a new party.

29. The data communication system according to claim 28, wherein said registration means is activated after communication is made with terminal equipment of a party other than one stored in said memory means, said registration means discriminating information identifying type of the terminal equipment of the party based on protocol during said communication and storing said information identifying type in said memory means.

30. The data communication system according to claim 23, wherein said designating means designates the relative precedence of transmission speed and transmission clearness for said transmission data.

* * * * *

UNITED STATES PATENT AND TRADEMARK OFFICE
CERTIFICATE OF CORRECTION

PATENT NO. : 5,095,445
DATED : March 10, 1992
INVENTOR(S) : Kenzo Sekiguchi

It is certified that error appears in the above-indentified patent and that said Letters Patent is hereby corrected as shown below:

On the title page: Item [30]

IN [30] FOREIGN APPLICATION PRIORITY DATA

"Oct. 10, 1987 [JP] Japan ...... 62-262634" should read --Oct. 19, 1987 [JP] .......... 62-264634--.

COLUMN 1

Line 7, "continuation-in-part" should be deleted.

COLUMN 2

Line 1, "transmitting," should read --transmitted,--.
Line 6, "housing" should read --having--.

COLUMN 8

Line 63, "data." should read --data).--.

COLUMN 15

Line 36, "date" should read --data--.

UNITED STATES PATENT AND TRADEMARK OFFICE
CERTIFICATE OF CORRECTION

PATENT NO. : 5,095,445

DATED : March 10, 1992

INVENTOR(S) : Kenzo Sekiguchi

It is certified that error appears in the above-indentified patent and that said Letters Patent is hereby corrected as shown below:

<u>COLUMN 16</u>

Line 42, "type" should read --types--.

Signed and Sealed this

Thirteenth Day of July, 1993

Attest:

MICHAEL K. KIRK

Attesting Officer

Acting Commissioner of Patents and Trademarks